(12) United States Patent
Akita et al.

(10) Patent No.: US 6,770,227 B2
(45) Date of Patent: Aug. 3, 2004

(54) CARBON MATERIAL

(75) Inventors: Hiroshi Akita, Wako (JP); Hiroto Kobayashi, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 629 days.

(21) Appl. No.: 09/846,201

(22) Filed: May 2, 2001

(65) Prior Publication Data

US 2001/0033821 A1 Oct. 25, 2001

Related U.S. Application Data

(62) Division of application No. 09/161,436, filed on Sep. 28, 1998, now abandoned.

(30) Foreign Application Priority Data

Sep. 29, 1997 (JP) .............................................. 9-279351

(51) Int. Cl.[7] .............................................. C01B 31/02
(52) U.S. Cl. ...................... 264/29.6; 264/320; 264/324; 423/447.4
(58) Field of Search .............................. 264/29.1, 29.6, 264/319, 320, 324, 339; 423/447.4, 445 R, 447.8, 448

(56) References Cited

U.S. PATENT DOCUMENTS

| | | |
|---|---|---|
| 3,775,520 A | 11/1973 | Ram et al. |
| 4,876,077 A | 10/1989 | Murakami |
| 4,915,984 A | 4/1990 | Murakami |
| 5,042,059 A | 8/1991 | Watanabe et al. |
| 5,043,185 A | 8/1991 | Murakami et al. |
| 5,064,019 A | 11/1991 | Murakami et al. |
| 5,167,945 A | 12/1992 | Ogawa et al. |
| 5,449,739 A | 9/1995 | Akita et al. |
| 5,698,340 A | 12/1997 | Xue et al. |
| 5,871,609 A | 2/1999 | Saito et al. |

OTHER PUBLICATIONS

Stephen L. Rosen, Fundamental Principles of Polymeric Materials, 1993, John Wiley & Sons, Canada.

*Primary Examiner*—Mathieu D. Vargot
(74) *Attorney, Agent, or Firm*—Birch, Stewart, Kolasch & Birch, LLP

(57) ABSTRACT

A carbon material which is an isotropic bulk material in which a rigid aromatic polymer or a reinforcing polymer is dispersed in the matrix polymer finely, homogeneously and sufficiently, and which is excellent in physical characteristics, particularly in conductivity, by mixing a matrix polymer with an aromatic heterocyclic copolymer precursor containing functional groups having heterocycle forming ability in which at least one of said functional groups is substituted by another functional group, in an organic solvent to form a mixed solution, removing the solvent therefrom to form a coagulum, thereby preparing a three-dimensional mesh type molecular composite material, and then burning the resulting composite material.

9 Claims, 6 Drawing Sheets

CARBON MATERIAL

This application is a divisional of co-pending Application No. 09/161,436, filed on Sep. 28, 1998, now abandoned the entire contents of which are hereby incorporated by reference and for which priority is claimed under 35 U.S.C. §120; and this application claims priority of Application No. 9-279351 filed in JAPAN on Sep. 29, 1997 under 35 U.S.C. §119.

BACKGROUND OF THE INVENTION

The present invention relates to carbon materials useful as structural materials used under severe conditions in terms of heat resistance, corrosion resistance and sliding characteristics, and as electrode materials in respect to conductivity and intercalation characteristics.

As methods for producing carbon materials which are having an important place in industrial materials, methods of carbonizing various kinds of organic materials at high temperatures have recently been proposed.

For example, carbon materials of good quality are obtained by carbonizing polymer materials. However, glassy carbon is so hard that it is very difficult to process carbonized products simple in shape into parts complicated in shape (Japanese Unexamined Patent Publication Nos. 61-275114 and 61-275115).

Further, production of carbon/carbon composite materials requires a multistage process comprising impregnating fibers with matrix resins such as phenol resins, carbonizing the resulting impregnated fibers, then impregnating the fibers with the matrix resins in an amount corresponding to a loss due to the carbonizing, and further carbonizing the impregnated fibers. Accordingly, the carbon/carbon composite materials are not used for general applications.

Then, if it becomes possible to form preforms having desired configurations from thermoplastic polymers excellent in formability and carbonize them, the applicability of carbon materials can conceivably be largely widened in terms of processability and production cost. From such a viewpoint, three-dimensional mesh type molecular composite materials are by far the best in stability in heating, compared with other materials, and expected to be useful for the above-mentioned purpose.

Further, rigid polymers are known to be easily graphitizable materials, and it is conceivable that new kinds of carbon/carbon nanocomposites can be formed by one-step carbonization as long as the fibril structure is maintained. Thus, development to unique functional carbon materials whose fine structure and characteristics can be designed by the amount of the rigid polymers added is expected.

SUMMARY OF THE INVENTION

An object of the present invention is to provide a carbon material which is an isotropic bulk material and excellent in physical characteristics, particularly in conductivity, by carbonizing a three-dimensional mesh type molecular composite material in which a rigid aromatic polymer or a reinforcing polymer is dispersed in a matrix polymer finely, homogeneously and sufficiently.

According to the present invention, there is provided a carbon material produced by mixing a matrix polymer with an aromatic heterocyclic copolymer precursor in which at least one functional group forming a heterocycle is substituted by another functional group, in an organic solvent to form a mixed solution, removing the solvent therefrom to form a coagulum, thereby preparing a three-dimensional mesh type molecular composite material, and then carbonizing the resulting composite material.

In the present invention, the carbon material is preferably an isotropic bulk material.

In this case, the matrix polymer is preferably a polyamide, and further, the aromatic heterocyclic copolymer is preferably at least one copolymer selected from the group consisting of polybenzothiazole copolymers and polybenzoxazole copolymers.

BRIEF DESCRIPTION OF THE DRAWINGS

These and other objects and advantages of this invention will become more apparent and more readily appreciated form the following detailed description of the presently preferred exemplary embodiment of the invention taken in conjunction with accompanying drawings, of which.

DESCRIPTION OF THE PREFERRED EMBODIMENTS

Figure 1:
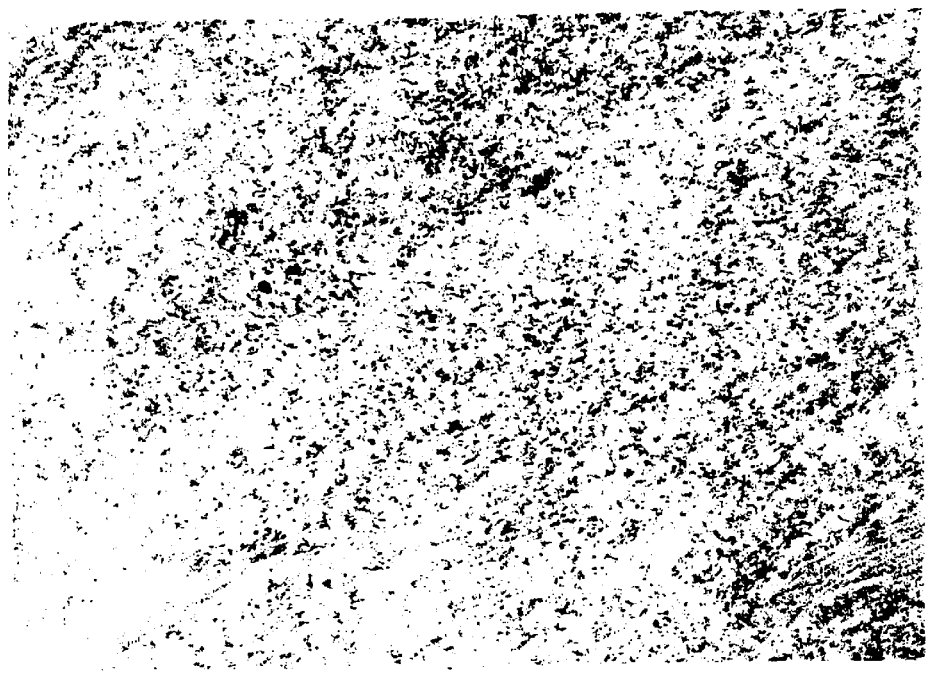
FIG. 1 is a transmission electron micrograph (magnification: 30,000×) showing the phase structure of a fine particle dispersion type molecular composite material before carbonization.

The matrix polymers used in the present invention include polyamides, polyimides, polyamideimides, aramid resins, polyethersulfones and polyetherimides. These matrix polymers are good in miscibility with the aromatic heterocyclic copolymers, and can provide the molecular composite materials excellent in mechanical strength. As the matrix polymers, aromatic polyamides are particularly preferred.

The aromatic heterocyclic copolymers are described below.

In the present invention, the aromatic heterocyclic copolymers acting as reinforcing polymers for the molecular composite materials, in which at least one of functional groups having heterocycle forming ability is substituted by another functional group, form three-dimensional mesh type structure in the composite materials, and are uniformly dispersed. Accordingly, the composite materials of the present invention have excellent mechanical characteristics. Such aromatic heterocyclic copolymers include random or block copolymers of polybenzothiazole (PBZ-T) or polybenzoxazole (PBZ-O).

In the production of the composite materials of the matrix polymers and these aromatic heterocyclic copolymers in the present invention, the matrix polymers are mixed with precursors of the above-mentioned aromatic heterocyclic copolymers to form composite materials, which are first preformed by mold hot pressing, and then heated at a specified temperature in a mold to induce a ring-closing reaction, thereby finally forming preformed three-dimensional mesh type molecular composite materials composed of the matrix polymers and the aromatic heterocyclic copolymers.

In order to allow the above-mentioned intramolecular ring-closing reaction to proceed smoothly, functional groups relating to the formation of heterocycles by the ring-closing reaction, namely hydrogen atoms of functional groups having heterocycle forming ability, are required to be substituted by substituent groups (functional groups) accelerating said ring-closing reaction in the above-mentioned aromatic heterocyclic copolymer precursors. When such substitution by the functional groups is not conducted, carbon materials obtained by preforming the composite materials in the mold and finally carbonizing the preformed three-dimensional mesh type molecular composite materials composed of the matrix polymers and the aromatic heterocyclic copolymers are not isotropic bulk materials.

Then, the preformed three-dimensional mesh type molecular composite materials are carbonized at atmospheric pressure under an inert gas atmosphere. The inert gases include helium, argon and nitrogen gases. The carbonization temperature is 2,300° C. to 3,000° C., and preferably 2,500° C. to 2,800° C. A temperature of less than 2,300° C. results in insufficient graphitization, whereas exceeding 3,000° C. provides no substantial effect for graphitization. Further, the carbonization time is 0.5 hour to 12 hours, and preferably 2 hours to 6 hours. Less than 0.5 hour generally results in insufficient graphitization, although it is not absolutely said so depending on the carbonization temperature, whereas exceeding 6 hours provides no substantial effect for graphitization.

First, polybenzothiazole (PBZ-T) copolymer precursors having thiazole rings as the condensed rings are illustrated.

Production of PBZ-T Copolymer Precursors

In the present invention, the PBZ-T copolymer precursors used as reinforcing polymers for the molecular composite materials are represented by the following general formula (1):

General Formula (1)

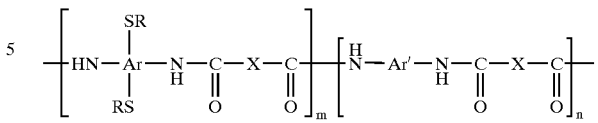

wherein Ar and Ar' are aromatic residues, R is an unsubstituted or substituted alkyl group, X is a dicarboxylic acid derivative residue, m and n are both integers, and m:n is 0.01:99.99 to 99.99:0.01.

These copolymer precursors are produced from (a) aromatic diaminodithiol compounds in which hydrogen atoms of thiol groups are substituted by unsubstituted or substituted alkyl groups, (b) aromatic diamino compounds and (c) dicarboxylic acid derivatives.

(a) Aromatic Diaminodithiol Compounds in which Hydrogen Atoms of Thiol Groups are Substituted by Unsubstituted or Substituted Alkyl Groups In the present invention, (a) the aromatic diaminodithiol compounds in which hydrogen atoms of thiol groups are substituted by unsubstituted or substituted alkyl groups (hereinafter also referred to as "compounds (a)") are represented by the following general formula (2):

General Formula (2)

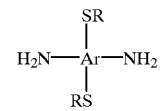

wherein Ar is an aromatic residue, and R is an unsubstituted or substituted alkyl group.

In this general formula, the aromatic residue Ar may be not only a benzene ring, but also an aromatic ring formed by condensation of two or more benzene rings, and may be a residue formed by binding of two or more benzene rings, such as biphenyl. The amino groups and the thioether groups on both sides may each be positioned in bilateral or point symmetry centered with respect to the aromatic residue. Examples of compounds (a) include the following compounds:

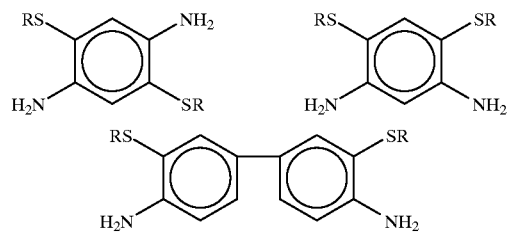

Compound (a) can be synthesized from an aromatic diaminodithiol compound, a compound having an amino group and a thiol group, respectively, on both sides of an aromatic residue.

As the aromatic diaminodithiol compound, a compound obtained by substituting a hydrogen atom for the alkyl group R of each compound shown above can be used. In order to prevent degradation, this aromatic diaminodithiol compound is used in the form of salts such as a hydrochloride.

The alkyl group R binding to the thiol group of the aromatic diaminodithiol compound is an unsubstituted or substituted alkyl group. The unsubstituted alkyl groups include isopropyl, ethyl, n-propyl, n-butyl, sec-butyl and tert-butyl groups. As the alkyl groups, secondary or tertiary alkyl groups are particularly preferred.

As the substituted alkyl groups, alkyl groups substituted by carboxyl, ester, cyano or benzene groups are preferably used. When the alkyl groups have such substituent groups, they are not necessarily secondary alkyl groups. Examples of the alkyl groups having the substituent groups include the following groups:

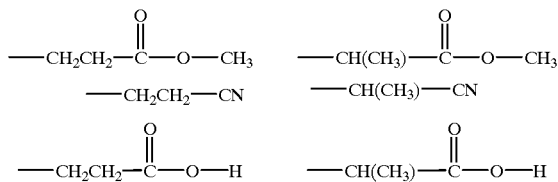

For the two substituted alkyl groups substituted for ester groups shown above, alkyl groups bonding to oxygen atoms of the ester linkages may be alkyl groups each having 2 to 10 carbon atoms, as well as methyl groups.

In particular, substitution of hydrogen atoms of the thiol groups of the aromatic diaminodithiol compounds with cyano group-containing alkyl groups or ester group-containing alkyl groups improves the solubility of the copolymer precursors (the above-mentioned polymers represented by general formula (1)) in organic solvents such as N-methyl-2-pyrrolidone.

The above-mentioned alkyl groups are used as alkyl halides, and compounds (a) are synthesized from the alkyl halides and the aromatic diaminodithiol compounds (salts thereof) previously described by the following method. The halides which can be used herein include bromides, chlorides and iodides of the above-mentioned alkyl groups.

In synthesis of compounds (a), the above-mentioned salts of the aromatic diaminodithiol compounds are allowed to react with the alkyl halides in alkaline aqueous solutions. As a alkaline aqueous solvent, there can be used a solvent in which a basic salt such as sodium hydroxide is dissolved in water or a mixed solvent of water and an alcohol(s) (ethanol and/or methanol). Alkalifying of the solvents makes it possible to dissolve the salts of the aromatic diaminodithiol compounds. Further, it increases the nucleophilicity of the thiol groups to promote the substitution reaction. The alkali concentration of the alkaline aqueous solvents is preferably 30% by weight or less.

This substitution reaction can be conducted at a temperature ranging from 0° C. to 100° C. A temperature of less than 0° C. unfavorably results in a low rate of reaction, whereas exceeding 100° C. unfavorably results in occurrence of a side reaction. The reaction temperature is more preferably 0° C. to 95° C.

Although there is no particular limitation on the reaction time, it is generally about 2 hours to about 24 hours.

In order to increase the rate of reaction, it is preferred to stir the solutions. Further, the use of excess alkyl halides can increase the rate of reaction.

Furthermore, addition of cetyltrimethylammonium chloride, n-butyltriphenylphosphonium bromide, tetraphenylphosphonium bromide or 18-crown-6 as a phase transfer catalyst can increase the rate of reaction. Such phase transfer catalysts accelerate the reaction of the salts of the aromatic diaminodithiol compounds with the alkyl halides.

The monomers (compounds (a)) in which the hydrogen atoms of the thiol groups of the salts of the aromatic diaminodithiol compounds are substituted by the alkyl groups can be obtained by conducting the substitution reaction under the above-mentioned conditions.

In the synthesis reaction of compound (a), the reaction of the salt of the aromatic diaminodithiol compound with the alkyl halide proceeds according to the following reaction equation (1):

Reaction Equation (1)

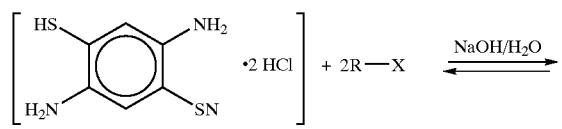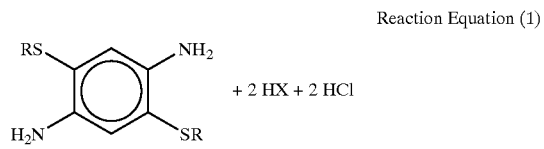

wherein 2,5-diamino-1,4-benzenedithiol dihydrochloride is used as an example of the salt of the aromatic diaminodithiol compound, and X-R represents an alkyl halide.

(b) Aromatic Diamino Compounds

As (b) the aromatic diamino compounds (hereinafter also referred to as "compounds (b)") used in the present invention, aromatic diamino compounds having the flexible structure are preferred, and diamines having aromatic residues such as diphenyl ether and biphenyl can be preferably used. Specifically, aromatic diamino compounds having the following aromatic residues can be used:

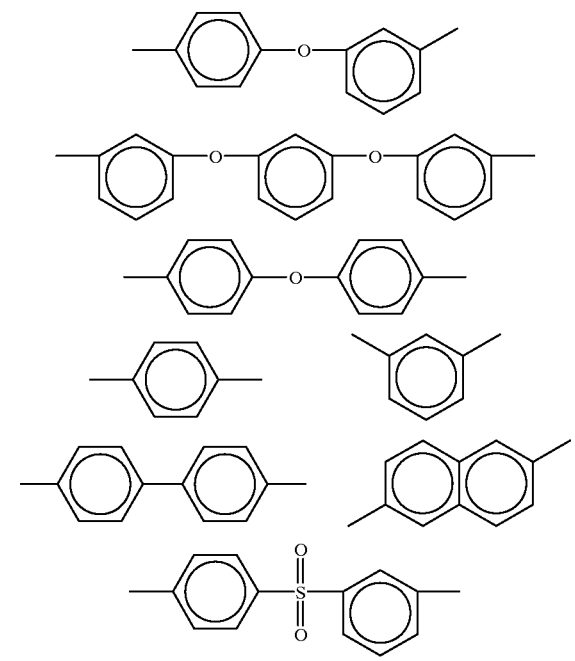

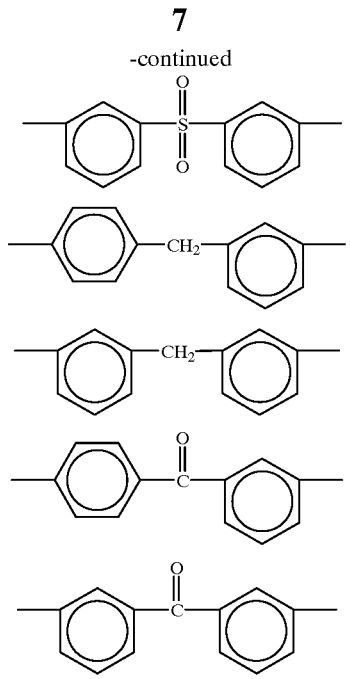

Of the above-mentioned aromatic residues, diphenyl ether and triphenyl ether groups are preferred. The use of such phenyl ether residues can provide sufficient flexibility to the resulting copolymer precursors.

Further, in order to improve the miscibility of the aromatic heterocyclic copolymer with the polymer used as the matrix polymer, it is preferred that a compound having the same structure as a part of the matrix polymer to be mixed or a structure similar thereto is selected as this compound (b).

(c) Dicarboxylic Acid Derivatives

As (c) the dicarboxylic acid derivatives (hereinafter also referred to as "compounds (c)") used in the present invention, there are derivatives in which carboxylic acid groups are substituted as shown below:

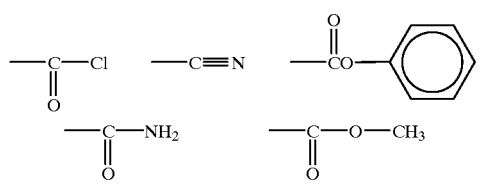

Further, residues of the above-mentioned dicarboxylic acid derivatives include alkylene groups each having relatively short chains (2 to 10 carbon atoms) and aromatic residues as shown below. Preferred examples of dicarboxylic acids include aromatic dicarboxylic acids.

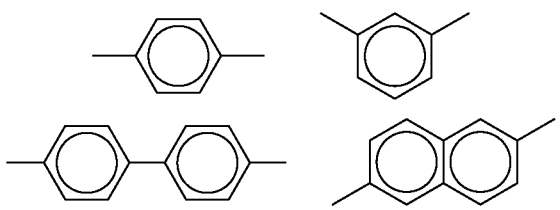

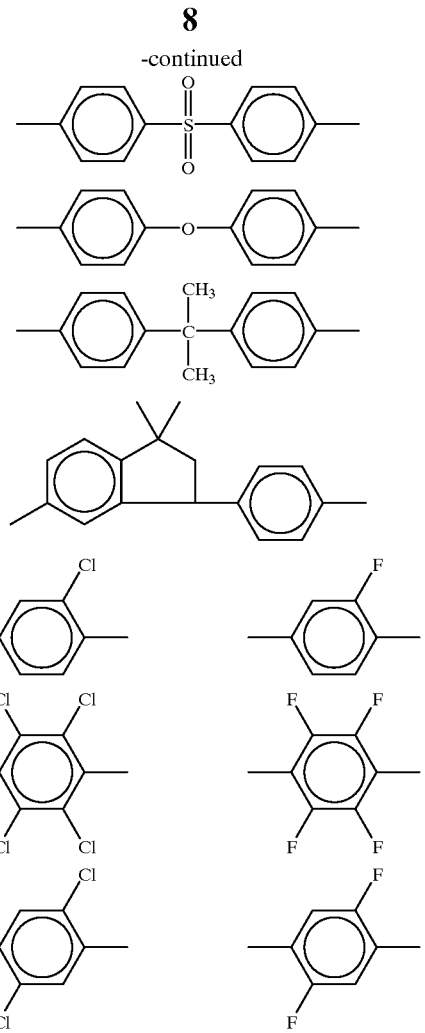

It is possible to add halogen and/or substituent groups such as lower alkyl, lower alkoxyl and phenyl to the aromatic residues. Introduction of such substituent groups can improve the reactivity and the solubility in solvents.

Of such aromatic dicarboxylic acid derivatives, terephthaloyl dichloride or halogen-substituted products thereof and isophthaloyl dichloride are particularly preferred. Specifically, 2-chloroterephthaloyl dichloride and 2,5-dichloroterephthaloyl dichloride can be suitably used. These aromatic dicarboxylic acid derivatives may be used alone or in combination.

(1) Production of PBZ-T Random Copolymer Precursors

Methods for producing the random copolymer precursors are described below. When the random copolymer is produced, compound (a), compound (b) and compound (c) (hereinafter also referred to as "compounds (a) to (c)") are dissolved in a desired compounding ratio in an organic solvent, and these three components are copolymerized. Preferably, a homogeneous solution of compound (a) and compound (b) is first prepared, and compound (c) is added thereto.

The compounding ratio of compound (a) to compound (b) in the solution using the organic solvent is the ratio of the portion converted to the rigid chain moiety to the portion forming the flexible chain moiety (namely, the ratio of m to n in the above-mentioned general formula (1)) in the PBZ-T random copolymer precursor. According to the purpose of use of the PBZ-T random copolymer precursor, the amount of compound (a) and compound (b) is appropriately determined. In the present invention, compound (a) and compound (b) are compounded so as to give an m:n ratio of 0.01:99.99 to 99.99:0.01.

The amount of compound (c) is at least the same amount as the total molar amount of compound (a) and compound (b). The total concentration of compounds (a) to (c) in the organic solvent is preferably about 0.1 mol/liter to about 2 mol/liter. A total concentration of compounds (a) to (c) exceeding 2 mol/liter unfavorably results in difficulty of dissolving each component.

As the organic solvents, organic solvents of the amide family can be suitably used. The organic solvents of the amide family include N-methyl-2-pyrrolidone (NMP), hexamethylphosphoric triamide and N,N-dimethylacetamide. They may be used alone or as a mixed solution. In order to enhance the reactivity, a metal salt such as LiCl or $CaCl_2$ may be added in a maximum amount of 5% by weight.

When compounds (a) to (c) are polymerized to produce the random copolymer precursor, the polymerization reaction temperature is preferably −20° C. to 50° C. A polymerization temperature of less than −20° C. results in occurrence of an insufficient polymerization reaction and in a reduction in the degree of polymerization of the resulting random copolymer precursor. On the other hand, the upper limit of the polymerization reaction temperature is 50° C. for safety because of the possibility that the thiazole ring-closing reaction takes place at a temperature of about 250° C. More preferably, the reaction temperature is −20° C. to 30° C.

In the above-mentioned polymerization reaction, it is preferred that the solution is stirred to enhance the rate of reaction. Although there is no particular limitation on the reaction time, it is generally about 1 hour to about 24 hours.

The polymerization reaction is conducted under the above-mentioned conditions, thereby obtaining the random copolymer precursor having a high degree of polymerization without occurrence of the thiazole ring-closing reaction. The inherent viscosity $\eta_{inh}$ (in NMP, 30° C., 0.5 g/dl) of the resulting random copolymer precursor is preferably 0.4 or more, and more preferably about 0.8 to about 1.6.

This polymerization reaction is considered to proceed according to the following reaction equation (2):

2-chloroterephthaloyl dichloride is used as an example of compound (c) and m and n represent the degree of polymerization.

The resulting random copolymer precursor can be washed and dried by known methods.

(2) Production of PBZ-T Block Copolymer Precursors

In the present invention, the block copolymer precursors are represented by the above-mentioned general formula (1), similarly to the above-mentioned random copolymer precursors, and can be produced from (a) the aromatic diaminodithiol compounds in which hydrogen atoms of thiol groups are substituted by unsubstituted or substituted alkyl groups, (b) the aromatic diamino compounds and (c) the dicarboxylic acid derivatives.

Specifically, the block copolymer precursor can be produced by (i) allowing compound (a) and compound (b) separately to react with compound (c) in an organic solvent, thereby synthesizing two kinds of oligomers, and (ii) allowing the resulting two kinds of oligomers to react with each other in an organic solvent.

The oligomer obtained by reaction of compound (a) with compound (c) forms an aromatic heterocyclic block acting as the rigid chain moiety in the aromatic heterocyclic copolymer. On the other hand, the oligomer obtained by reaction of compound (b) with compound (c) forms the flexible moiety in the aromatic heterocyclic copolymer.

For simplifying the description herein, the oligomer obtained by reaction of compound (a) with compound (c) is hereinafter referred to as "oligomer (I)", and the oligomer obtained by reaction of compound (b) with compound (c) is referred to as "oligomer (II)".

(2)-1 Synthesis of Oligomers for PBZ-T Copolymer Precursors

In an organic solvent, (a) the aromatic diaminodithiol compound and (c) the carboxylic acid derivative are dissolved, and the resulting solution is stirred at a specified temperature to produce oligomer (I).

In the synthesis of oligomer (I), the molar amount of compound (a) is basically the same as that of compound (c). However, in order to obtain oligomer (I) having a suitable molecular weight and to improve the reaction with oligomer (II) given later, the amount of compound (c) may be adjusted.

Reaction Equation (2)

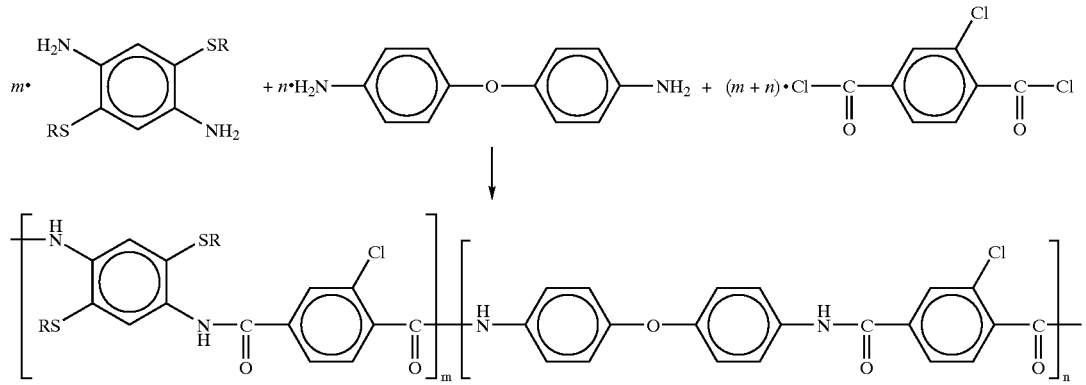

wherein an alkyl group-substituted product of 2,5-diamino-1,4-benzenedithiol dihydrochloride is used as an example of compound (a), 4,4'-diaminodiphenyl ether (4-amino-p-phenoxyaniline) is used as an example of compound (b), Further, the total concentration of compound (a) and compound (c) is preferably about 0.5 mol/liter to about 5 mol/liter. A concentration exceeding 5 mol/liter unfavorably results in difficulty of dissolving each component.

The organic solvents include organic solvents similar to those used in the production of the random copolymers.

When (a) the aromatic diaminodithiol compound is allowed to react with (c) the dicarboxylic acid derivative to synthesize oligomer (I), the polymerization reaction temperature is preferably −20° C. to 200° C. A reaction temperature of less than −20° C. results in occurrence of an insufficient polymerization reaction. On the other hand, the upper limit of the polymerization reaction temperature is 200° C. for safety because of the possibility that the thiazole ring-closing reaction takes place at a temperature of about 250° C. More preferably, the reaction temperature is −10° C. to 50° C.

In the above-mentioned synthesis of oligomer (I), it is preferred to stir the solution in order to enhance the rate of reaction. Further, the reaction time is preferably about 1 minute to about 120 minutes.

The polymerization reaction of compound (a) with compound (c) is considered to proceed according to the following reaction equation (3):

Reaction Equation (3)

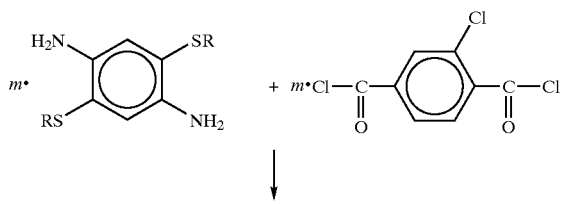

of oligomer (II) is also adjusted to the amount of compound (c) in the synthesis of oligomer (I).

The total concentration of compound (b) and compound (c) in the organic solvent is preferably about 0.5 mol/liter to about 5 mol/liter.

The polymerization reaction temperature is preferably −20° C. to 300° C., and more preferably −20° C. to 200° C. A reaction temperature of less than −20° C. results in occurrence of an insufficient polymerization reaction. On the other hand, the upper limit of the polymerization reaction temperature is 300° C. for safety because of occurrence of thermal decomposition at a temperature of about 400° C. More preferably, the reaction temperature is −10° C. to 50° C.

The organic solvents used in the synthesis of oligomer (II) include the same solvents as used in the above-mentioned synthesis of oligomer (I).

Although there is no particular limitation on the reaction time, it is generally about 1 minute to about 120 minutes.

The polymerization reaction of compound (b) with compound (c) is considered to proceed according to the following reaction equation (4):

Reaction Equation (4)

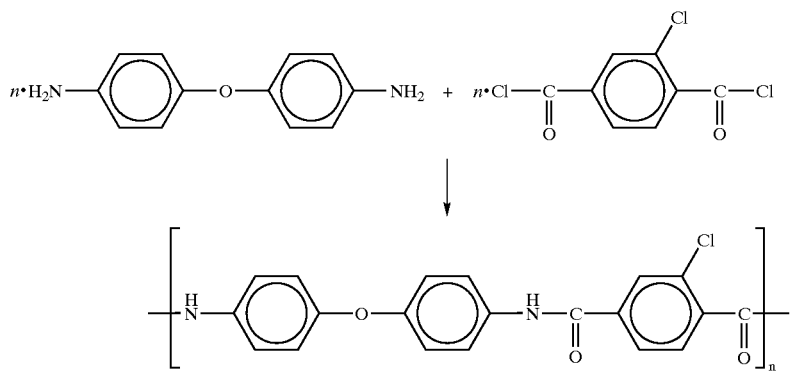

-continued

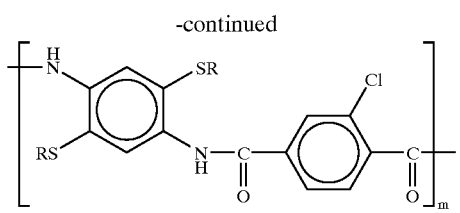

wherein an alkyl group-substituted product of 2,5-diamino-1,4-benzenedithiol dihydrochloride is used as an example of compound (a), 2-chloroterephthaloyl dichloride is used as an example of compound (c), and m represents the degree of polymerization. The inherent viscosity $\eta_{inh}$ (in NMP, 30° C., 0.5 g/dl) of oligomer (I) is about 0.1 to about 0.7.

Oligomer (II) can also be synthesized in a manner similar to the above-mentioned synthesis method of oligomer basically the same as that of compound (b). However, it is preferred that the amount of compound (c) in the synthesis wherein 4,4'-diaminodiphenyl ether (4-amino-p-phenoxyaniline is used as an example of compound (b), and 2-chloroterephthaloyl dichloride is used as an example of compound (c), and n represents the degree of polymerization. The inherent viscosity $\eta_{inh}$ (in NMP, 30° C., 0.5 g/dl) of oligomer (II) is about 0.1 to about 0.6.

(2)-2 Production of PBZ-T Block Copolymer Precursors

Oligomer (I) and oligomer (II) obtained by the above-mentioned methods are allowed to react with each other in an organic solvent to synthesize a PBZ-T block copolymer precursor. As the organic solvent, the solvent used in the above-mentioned synthesis of oligomer (I) or oligomer (II) can be employed.

Specifically, the organic solvent in which oligomer (I) is dissolved is mixed with the organic solvent in which oligomer (II) is dissolved, and the resulting mixture is stirred at a temperature of −10° C. to 50° C. to synthesize the block copolymer precursor. The polymerization reaction does not proceed at a temperature of less than −10° C. Exceeding 250° C. results in progress of the thiazole ring-closing reaction, so that the upper limit of the polymerization reaction temperature is 50° C. for safety.

The polymerization reaction is conducted under the above-mentioned conditions, thereby obtaining the block copolymer precursor having a high degree of polymerization without occurrence of the thiazole ring-closing reaction. The inherent viscosity $\eta_{inh}$ (in NMP, 30° C., 0.5 g/dl) of the resulting PBZ-T block copolymer precursor is about 0.6 to about 1.8.

The polymerization reaction of oligomer (I) with oligomer (II) proceeds according to the following reaction equation (5) to obtain the block copolymer precursor:

block copolymer precursor, combined by n in the above-mentioned formula), ranges from 0.01:99.99 to 99.99:0.01.

The resulting block copolymer precursor can be washed and dried by known methods.

Then, polybenzoxazole (PBZ-O) copolymer precursors having oxazole rings as the condensed rings are illustrated.

Production of PBZ-O Copolymer Precursors

In the present invention, the PBZ-O copolymer precursors are represented by the following general formula (3):

Reaction Equation (5)

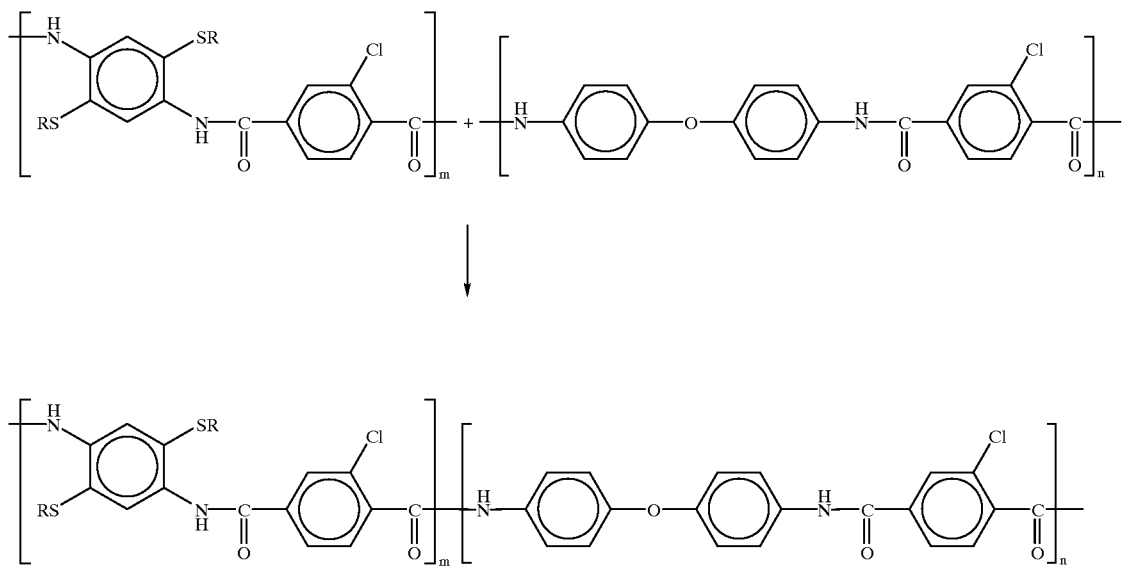

General Formula (3)

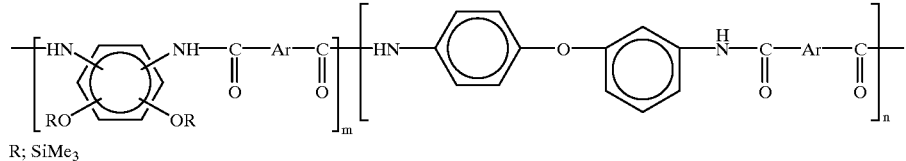

R; SiMe$_3$ wherein the oligomer obtained according to reaction equation (3) described above is used as oligomer(I), and the oligomer obtained according to reaction equation (4) described above is used as oligomer(II). However, the present invention is not limited thereto.

In this equation, m and n represent the degree of polymerization. In the present invention, m:n, the ratio of the total of m in one copolymer (the total degree of polymerization of the moiety in the block copolymer precursor, combined by m in the above-mentioned formula) to the total of n (the total degree of polymerization of the moiety in the wherein Ar is an aromatic residue, m and n are both integers, and m:n is 0.01:99.99 to 99.99:0.01.

The PBZ-O copolymer precursors can be produced from (d) aromatic diaminohydroxy compounds in which hydrogen atoms of amino groups are substituted or unsubstituted and hydrogen atoms of hydroxyl groups are substituted, (e) aromatic diamino compounds in which hydrogen atoms of amino groups are substituted and (c) dicarboxylic acid derivatives.

(d) Aromatic Diaminodihydroxy Compounds in which Hydrogen Atoms of Amino Groups are Substituted or Unsubstituted and Hydrogen Atoms of Hydroxyl Groups are Substituted In the present invention, (d) the aromatic diaminodihydroxy compounds in which hydrogen atoms of hydroxyl groups are substituted (hereinafter also referred to as "compounds (d)") are compounds each having amino groups and hydroxyl groups, respectively, on both sides. The aromatic residue may be not only a benzene ring, but also an aromatic ring formed by condensation of two or more benzene rings, and may be a residue formed by binding of two or more benzene rings, such as biphenyl. The amino groups and the hydroxyl groups on both sides may each be positioned in bilateral or point symmetry centered with respect to the aromatic residue. Examples of such aromatic diaminodihydroxy compounds include the following compounds:

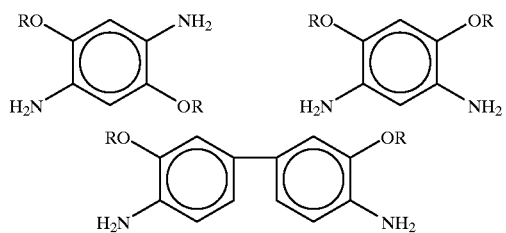

In the present invention, (d) the aromatic diaminodihydroxy compounds in which hydrogen atoms of their hydroxyl groups are substituted (aromatic diamino di-substituted oxy compounds) may be compounds in which hydrogen atoms of their amino groups are substituted. However, it is necessary that the hydrogen atoms of the hydroxyl groups are substituted by functional groups R for smoothing the intramolecular ring-closing reaction. As such functional groups, silyl groups can be preferably used. Silylated compounds in which hydrogen atoms are substituted by silyl groups are preferably used for the production of the copolymer precursors, because copolymer precursors having a high molecular weight can be obtained in high yields.

Further, in (d) the aromatic diamino di-substituted oxy compounds described above, aromatic residues thereof may have substituent groups such as Cl. In order to prevent degradation, these aromatic diamino disubstituted oxy compounds are preferably used in the form of salts such as hydrochlorides.

As the aromatic diamino di-substituted oxy compounds, 4,6-diamino-1,3-disilyloxybenzene (or salts thereof) are particularly preferably used.

(e) Aromatic Diamino Compounds in which Hydrogen Groups of Amino Groups are Substituted or Unsubstituted As (e) the aromatic diamino compounds (hereinafter also referred to as "compounds (e)") used in the present invention, aromatic diamino compounds having the flexible structure are preferred, and diamines having aromatic residues such as diphenyl ether and biphenyl can be preferably used. Specifically, compounds having the aromatic residues shown above with respect to the aromatic diamino compounds (b) for the PBZ-T copolymer precursors can be used. The hydrogen atoms of the amino groups of these aromatic diamino compounds may be substituted. In particular, silylated compounds are preferred. Of the above-mentioned aromatic residues, diphenyl ether and triphenyl ether groups are preferred. The use of such phenyl ether groups can provide sufficient flexibility to the resulting copolymer precursors.

Further, in order to improve the miscibility of the copolymer precursor with the polymer used as the matrix polymer, it is preferred that a compound having the same structure as a part of the matrix polymer to be mixed or a structure similar thereto is selected as this compound (e).

In the present invention, the PBZ-O copolymer precursor is obtained from the above-mentioned compound (d), compound (e) and compounds (c) (hereinafter also referred to as "compounds (c) to (e)), and the copolymer may be either a block copolymer or a random copolymer. Methods for producing these copolymer precursors are described below.

(3) Production of PBZ-O Random Copolymer Precursors

For the production of the PBZ-O random copolymer precursors, it is preferred that the aromatic diaminodihydroxy derivatives in which amino groups of the aromatic diamino di-substituted oxy compound are silylated to give silyl groups as substituent groups of di-substituted oxy groups are used as compounds (d), that the aromatic diamino compounds in which amino groups are silylated are used as compounds (e), and that these are allowed to react with compounds (c). When the copolymer precursors are produced using the silylated compounds as compounds (d) and compounds (e) as described above, the copolymer precursors having a high molecular weight can be obtained in high yields.

For silylation of the amino groups and the hydroxyl groups of the aromatic diaminodihydroxy compounds used as raw materials for the production of compounds (d), the aromatic diaminodihydroxy compounds or salts thereof, particularly hydrochlorides, are treated with nitrogen-containing silylating agents in organic solvents or without solvents at 80° C. to 140° C. for 6 hours to 72 hours.

The nitrogen-containing silylating agents effective for such silylation reaction include hexamethyldisilazane, N,N-diethylaminotrimethylsilane, N,O-bis(trimethylsilyl)carbamate and N-trimethylsilylimidazole.

Although tetrahydrofuran, carbon tetrachloride, N,N-dimethylacetamide and the like can be used as the organic solvents for the silylation reaction, the organic solvents can also be omitted. A silylation temperature of lower than 80° C. results in insufficient reactivity, whereas a temperature of higher than 140° C. unfavorably results in decomposition of amine hydrochlorides.

Similarly, (e) the aromatic diamino compounds can also be silylated.

After the production of the silylated compound under the above-mentioned conditions, the above-mentioned compounds (c) to (e) are dissolved in a desired compounding ratio in an organic solvent. The resulting solution is stirred at a temperature of −10° C. to 40° C. for 6 hours to 24 hours to copolymerize these three components. Preferably, a homogeneous solution of compound (d) and compound (e) is first prepared, and compound (c) is added thereto. The polymerization reaction does not proceed at a polymerization temperature of less than −20° C. On the other hand, exceeding 250° C. results in progress of the thiazole ring-closing reaction. The temperature is established within the above-mentioned range for safety.

The polymerization reaction is conducted under the above-mentioned conditions, thereby obtaining the random copolymer precursor having a high degree of polymerization in which hydrogen atoms of hydroxyl groups for forming oxazole rings, without occurrence of the thiazole ring-closing reaction. The inherent viscosity $\eta_{inh}$ (in NMP, 30° C., 0.5 g/dl) of the resulting PBZ-O random copolymer precursor is about 0.5 to about 1.8.

The compounding ratio of compound (d) to compound (e) in the solution using the organic solvent is the ratio of the portion converted to the rigid chain moiety to the portion forming the flexible chain moiety (namely, the ratio of m to n in the above-mentioned general formula (3)) in the random copolymer finally obtained. According to the purpose of use of the random copolymer precursor, the compounding ratio of compound (d) to compound (e) is appropriately determined. In the present invention, m:n can be within the range from 0.01:99.99 to 99.99:0.01.

The amount of compound (c) is at least the same amount as the total molar amount of compound (d) and compound (e). The total concentration of compound (c) to (e) in the organic solvent is preferably about 0.1 mol/liter to about 2 mol/liter. A concentration exceeding 2 mol/liter unfavorably results in difficulty of dissolving each component.

Examples of the organic solvents include amide solvents such as N,N-dimethylformamide, N,N-dimethylacetamide and N-methyl-2-pyrrolidone (NMP), aromatic amine solvents such as pyridine, sulfur solvents such as dimethyl sulfoxide (DMSO) and tetramethyl sulfone, benzene solvents such as benzene, toluene, anisole, diphenyl ether, nitrobenzene and benzonitrile, ether solvents such as tetrahydrofuran and 1,4-dioxane, and aprotic solvents, for example, hydrocarbon halides such as chloroform, trichloroethane and carbon tetrachloride.

The resulting random copolymer precursor can be washed and dried by known methods.

(4) Production of PBZ-O Block Copolymer Precursors

In the present invention, the PBZ-O block copolymer precursors are represented by the above-mentioned general formula (3), similarly to the above-mentioned random copolymers, and can be produced from (d) the aromatic diaminodihydroxy derivatives in which amino groups of the aromatic diamino di-substituted oxy compound are silylated to give silyl groups as substituent groups of di-substituted oxy groups, (e) the silylated aromatic diamino compounds and (c) the dicarboxylic acid derivatives, in a manner similar to the above.

Specifically, the PBZ-O block copolymer precursor can be produced by (i) allowing compound (d) and compound (e) separately to react with compound (c) in an organic solvent, thereby synthesizing two kinds of oligomers, and (ii) allowing the resulting two kinds of oligomers to react with each other in an organic solvent.

For simplifying the description herein, the oligomer obtained by reaction of compound (d) with compound (c) is hereinafter referred to as "oligomer (III)", and the oligomer obtained by reaction of compound (e) with compound (c) is referred to as "oligomer (IV)".

(4)-1 Synthesis of Oligomers for PBZ-O Block Copolymer Precursors

The silylated aromatic diaminodihydroxy compound is produced under the above-mentioned conditions, and then, the resulting silylated aromatic diaminodihydroxy compound is allowed to react with the dicarboxylic acid derivative to produce oligomer (III). The reaction of the silylated aromatic diaminodihydroxy compound with the dicarboxylic acid derivative compound is conducted in an organic solvent, under conditions substantially free from water and oxygen, in an atmosphere of dried nitrogen or argon gas, at a temperature of −10° C. to 100° C. for 0.5 hour to 2 hours, although they vary according to the solvent used. A reaction temperature of less than −10° C. results in insufficient reactivity, whereas exceeding 100° C. results in the fear of oxidation of the above-mentioned reaction product. Preferably, the reaction temperature is −10° C. to 40° C.

The molar amount of compound (d) is basically the same as that of compound (c). However, it is preferred that the molar amount of compound (c) is properly varied to that of compound (d). The adjustment of the amount of compound (c) is described later.

Further, the total concentration of compound (d) and compound (c) in the organic solvent is preferably about 0.1 mol/liter to about 2 mol/liter. A concentration exceeding 2 mol/liter unfavorably results in difficulty of dissolving each component.

The organic solvents include the same solvents as used in the production of the random copolymer precursors.

The polymerization reaction of compound (d) with compound (c) is considered to proceed according to the following reaction equation (6):

Reaction Equaton (6)

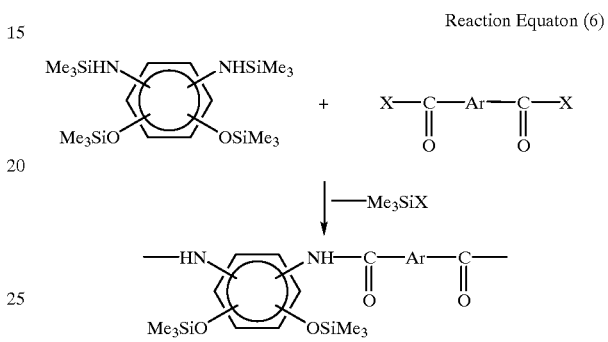

wherein silylated diaminodihydroxybenzene is used as the silylated aromatic diaminohydroxy compound, Ar represents an aromatic residue, X represents halogen, and Me represents a methyl group.

Similarly to the above-mentioned synthesis of oligomer (III), oligomer (IV) can also be synthesized by using a silylated aromatic diamino compound as compound (e) to allow it to react with a dicarboxylic acid derivative.

In the synthesis of oligomer (IV), the amount of the dicarboxylic acid derivative (c) is also basically the same as that of compound (e). However, it is preferred that the amount of compound (c) in the synthesis of oligomer (IV) is also adjusted to the amount of compound (c) in the synthesis of compound (III). This is described later.

The total concentration of compound (e) and compound (c) in the organic solvent is preferably about 0.1 mol/liter to about 2 mol/liter. A concentration exceeding 2 mol/liter unfavorably results in difficulty of dissolving each component.

The polymerization reaction is conducted at a temperature of −10° C. to 100° C. for 6 hours to 24 hours. A reaction temperature of less than −10° C. results in insufficient reactivity, whereas exceeding 100° C. results in the fear of oxidation of the above-mentioned reaction product. Preferably, the reaction temperature is −10° C. to 40° C.

The organic solvents used in the synthesis of oligomer (IV) include the same solvents as used in the above-mentioned synthesis of oligomer (III).

The polymerization reaction of compound (e) with compound (c) is considered to proceed according to the following reaction equation (7):

Reaction Equaton (7)

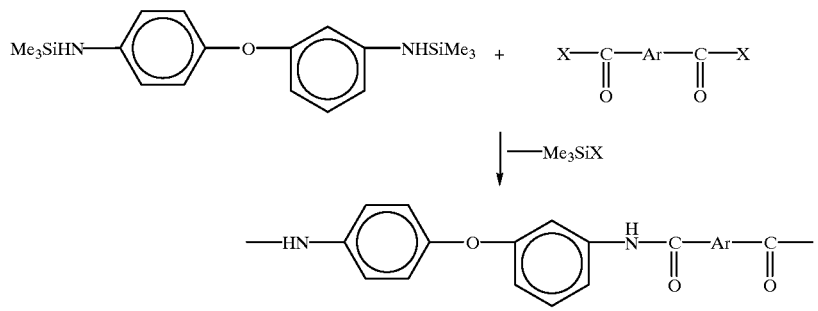

wherein silylated 3,4'-diaminodiphenyl ether is used as the silylated aromatic diamino compound (e), Ar represents an aromatic residue, X represents halogen, and Me represents a methyl group.

The adjustment of the amount of compound (c) in the synthesis of oligomer (III) and oligomer (IV) is described below.

In the synthesis of each oligomer, the molar amount of compound (c) is basically the same as that of compound (d) or compound (e). However, it is preferred that the molar amount of compound (c) is properly varied to that of compound (d) or compound (e), for the following reasons:

(1) One of oligomer (III) and oligomer (IV) is terminated with —COCl, and the other is terminated with —NH2 so that oligomer (III) and oligomer (IV) are well reacted with each other; and (2) The molecular weight of oligomer (III) or oligomer (IV) is properly adjusted.

According to the studies of the present inventors, when a relatively large amount of oligomer (III) is used in the production of the copolymer precursor given later (namely, when many rigid moieties having dihydroxyl groups are introduced into the PBZ-O copolymer finally obtained), it is preferred that the amount of compound (c) in the synthesis of oligomer (III) is somewhat larger than the number of moles of compound (d). On the other hand, when the amount of oligomer (III) is smaller than that of oligomer (IV) in the production of the copolymer precursor, it is preferred that the amount of compound (c) in the synthesis of oligomer (III) is slightly smaller than the number of moles of compound (d). However, when the amount of compound (c) is slightly decreased in the synthesis of one oligomer, the amount of compound (c) is increased by that decrease in the synthesis of the other oligomer.

(4)-2 Production of PBZ-O Block Copolymers

Oligomer (III) and oligomer (IV) obtained by the methods described above are allowed to react with each other in an organic solvent to synthesize a PBZ-O block copolymer. As the organic solvent, there can be employed the solvent used in the above-mentioned synthesis of oligomer (III) or oligomer (IV).

Specifically, the organic solvent in which oligomer (III) is dissolved is mixed with the organic solvent in which oligomer (IV) is dissolved, and the resulting mixture is stirred at a temperature of −20° C. to 250° C. for 6 hours to 24 hours to synthesize a block copolymer precursor. The polymerization reaction does not proceed at a temperature of less than −20° C. On the other hand, exceeding 250° C. results in progress of the thiazole ring-closing reaction. Therefore the reaction temperature is preferably −10° C. to 40° C.

The polymerization reaction is conducted under the above-mentioned conditions, thereby obtaining the PBZ-O block copolymer precursor having a high degree of polymerization without occurrence of the thiazole ring-closing reaction. The inherent viscosity $\eta_{inh}$ (in NMP, 30° C., 0.5 g/dl) of the resulting PBZ-O block copolymer precursor is about 0.5 to about 1.8.

The polymerization reaction of oligomer (III) with oligomer (IV) proceeds according to the following reaction equation (8) to obtain the block copolymer precursor:

Reaction Equation (8)

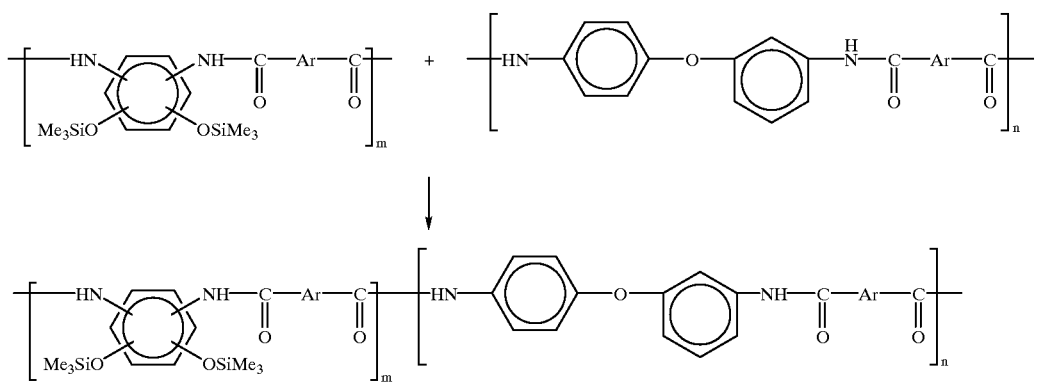

wherein m and n represents the degree of polymerization, and m:n can be within the range from 0.01:99.99 to 99.99:0.01.

Here, the oligomer obtained according to reaction equation (6) described above is used as oligomer(III), and the oligomer obtained according to reaction equation (7) described above is used as oligomer(IV). However, the present invention is not limited thereto.

The resulting block copolymer precursor can be washed and dried by known methods.

Methods for Producing Molecular Composite Materials

For obtaining the three-dimensional mesh type molecular composite materials of the present invention, the above-mentioned matrix polymers and the aromatic heterocyclic copolymer precursors obtained as described above are first dissolved in organic solvents having good solubility to both to mix them with each other, and then the solvents are removed therefrom for coagulation to obtain the molecular composite materials composed of the matrix polymers and the copolymer precursors.

The organic solvents suitably used include organic solvents of the amide family such as N-methyl-2-pyrrolidone, hexamethylphosphoric triamide and N,N-dimethylacetamide, and dimethyl sulfoxide.

In the compounding of the copolymer precursor and the matrix polymer, even a very small amount of the copolymer precursor gives the reinforcing effect. However, the compounding ratio of the copolymer precursor to the matrix polymer is preferably established so that it is finally within the range from 1:99 to 70:30 by weight. If the compounding ratio of the aromatic heterocyclic copolymer acting as a reinforcing polymer is too high, its existence becomes too dense. Accordingly, molecules of the aromatic heterocyclic copolymer aggregate, resulting in poor dispersion at the molecular level, which conceivably decreases the mechanical strength of the molecular composite material. More preferably, the compounding ratio is 1:99 to 60:40.

The copolymer precursor and the matrix polymer may be dissolved by any methods, as long as a homogeneous solution is obtained. For example, a solution of the copolymer precursor and a solution of the matrix polymer may each be prepared, followed by mixing them with each other to provide a homogeneous solution, or the matrix polymer may be added to a solution in which the copolymer precursor is dissolved to form a homogeneous solution. Further, both may be dissolved in one kind of solvent at the same time. The final concentration of the solutions is preferably 10 to 40% by weight, and more preferably 15 to 30% by weight.

The mixing time is preferably about 6 hours to about 30 days, although it somewhat varies according to the matrix polymer and solvent used. Further, the mixing temperature is $-15°$ C. to $150°$ C., preferably room temperature to $80°$ C., and more preferably room temperature to $60°$ C. The copolymer precursor solution and the matrix polymer solution are preferably prepared and mixed in an atmosphere of an inert gas such as nitrogen or argon gas, or under vacuum.

Methods for removing the solvents include introduction of the solutions of the matrix polymers and the aromatic heterocyclic copolymer precursors into non-solvents, and drying of the solutions to cast films.

The non-solvents include alcohols such as methanol and ethanol and distilled water.

Methods for introducing the solutions into the non-solvents may be any, including spraying, dropping, pouring in the fiber form, and spreading in the tabular form to coagulate the solutions in the non-solvents. The spraying is preferred among others.

Then, the composite materials of the matrix polymers and the aromatic heterocyclic copolymer precursors obtained above are formed into preforms (composite materials) having specific configurations by mold hot pressing. When the fibrous composite coagulums are used in this case, they may be drawn for use. They may be placed in molds as they are in the long fiber form, or as fiber cut to a length of about 2 mm to about 10 mm.

The molding is conducted in such a manner that the ring-closing reaction of the aromatic heterocyclic copolymer precursors does not occur. The molding temperature is preferably $200°$ C. to $400°$ C. Less than $200°$ C. results in insufficient molding fluidity to cause the fear of development of voids, whereas exceeding $400°$ C. unfavorably initiates the ring-closing reaction. The pressure is preferably 10 kgf/cm$^2$ to 500 kgf/cm$^2$, and more preferably 100 kgf/cm$^2$ to 300 kgf/cm$^2$. Less than 10 kgf/cm$^2$ results in remaining of voids in the composite materials, whereas exceeding 500 kgf/cm$^2$ results in application of residual stress to the composite materials. The molding is preferably performed in a glove box in an atmosphere of an inert gas such as argon.

In the present invention, after the mold hot pressing, the temperature of the molds is elevated as such to heat treat the preforms in the molds under pressure, thereby allowing the thiazole or oxazole ring-closing reaction to occur in the copolymer precursors forming the preforms. Thus, the composite materials of the aromatic heterocyclic copolymers are produced.

The heating temperature of homogeneous mixtures of the copolymer precursors and the matrix polymers is generally $250°$ C. to $350°$ C., although it varies depending on the kind of matrix polymer used. The formation of aromatic heterocycles such as thiazole and oxazole rings is not observed at a temperature of lower than $250°$ C. It is most suitable that the temperature is elevated to $320°$ C. at a rate of temperature elevation of $1°$ C./minute after molding, followed by heating for 5 minutes. If the rate of temperature elevation and the heating temperature exceed these value, the material is unfavorably decomposed. The heating may be conducted not only at a constant temperature, but also according to a heating program in which the temperature is gradually changed.

Further, the heating is preferably conducted in an atmosphere of an inert gas. The pressure in heating is preferably 50 kgf/cm$^2$ to 300 kgf/cm$^2$.

In this heating, alkyl groups R are eliminated for the PBZ-T copolymer precursors, and protective groups such as methanol and methyl trimethyl silyl ether for the PBZ-O copolymer precursors, and thiazole rings or oxazole rings are formed at these sites to form the aromatic heterocyclic copolymers.

When the PBZ-T block copolymer precursor obtained according to reaction equation (5) described above is used as the copolymer precursor, an aromatic heterocyclic block copolymer having the following structural formula (4) is formed:

Structural Formula (4)

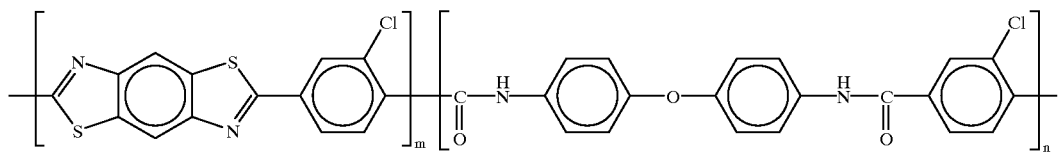

When the PBZ-O copolymer precursor obtained according to reaction equation (8) described above is used as the copolymer precursor, an aromatic heterocyclic copolymer having the following structural formula (5) is formed:

In the molecular composite materials before carbonization, the aromatic heterocyclic copolymers or the reinforcing materials form the three-dimensional mesh structure and are dispersed very finely and homogeneously Structural Formula (5)

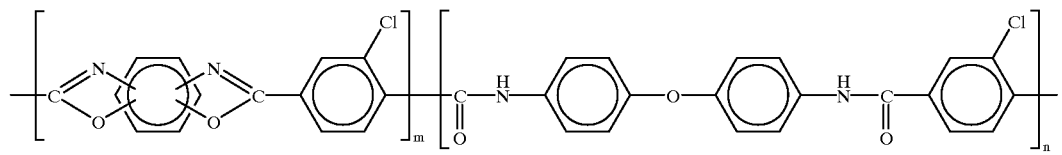

Figure 9:
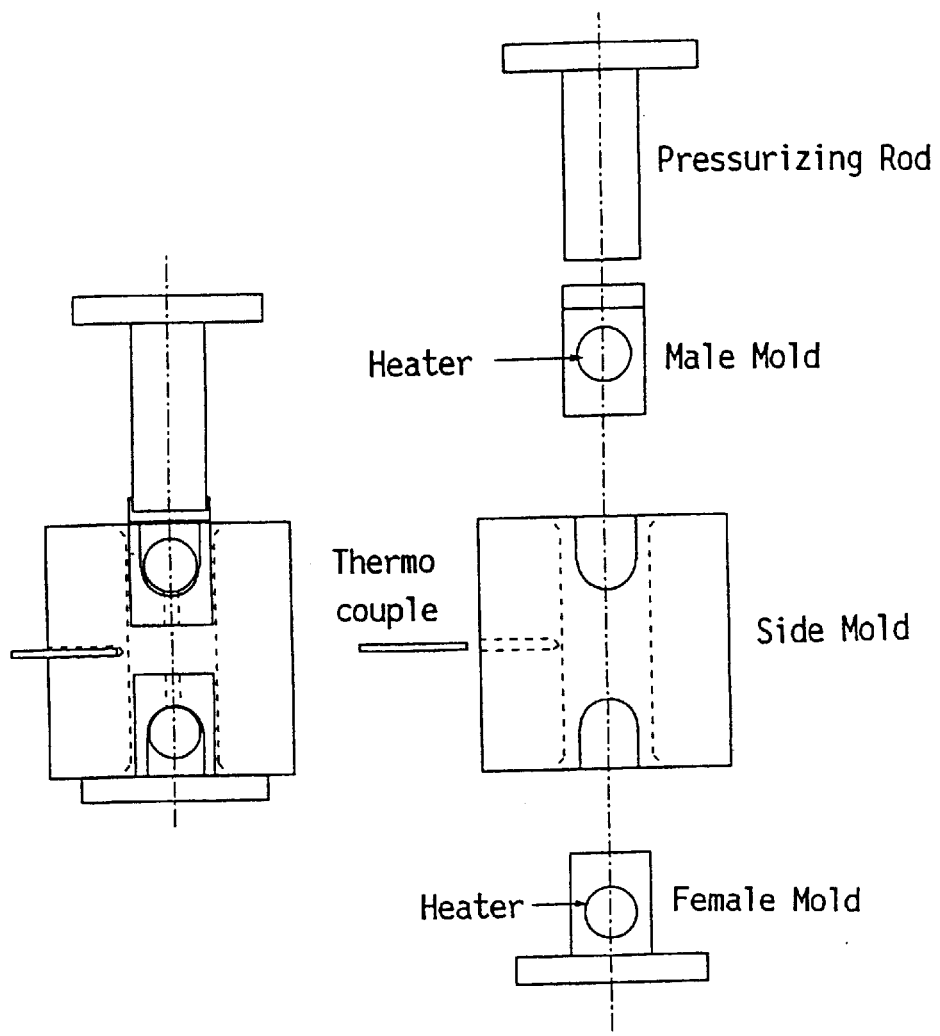
FIG. 9 is a structural view showing a mold used in Comparative Examples 2 and 3.
Figure 10:
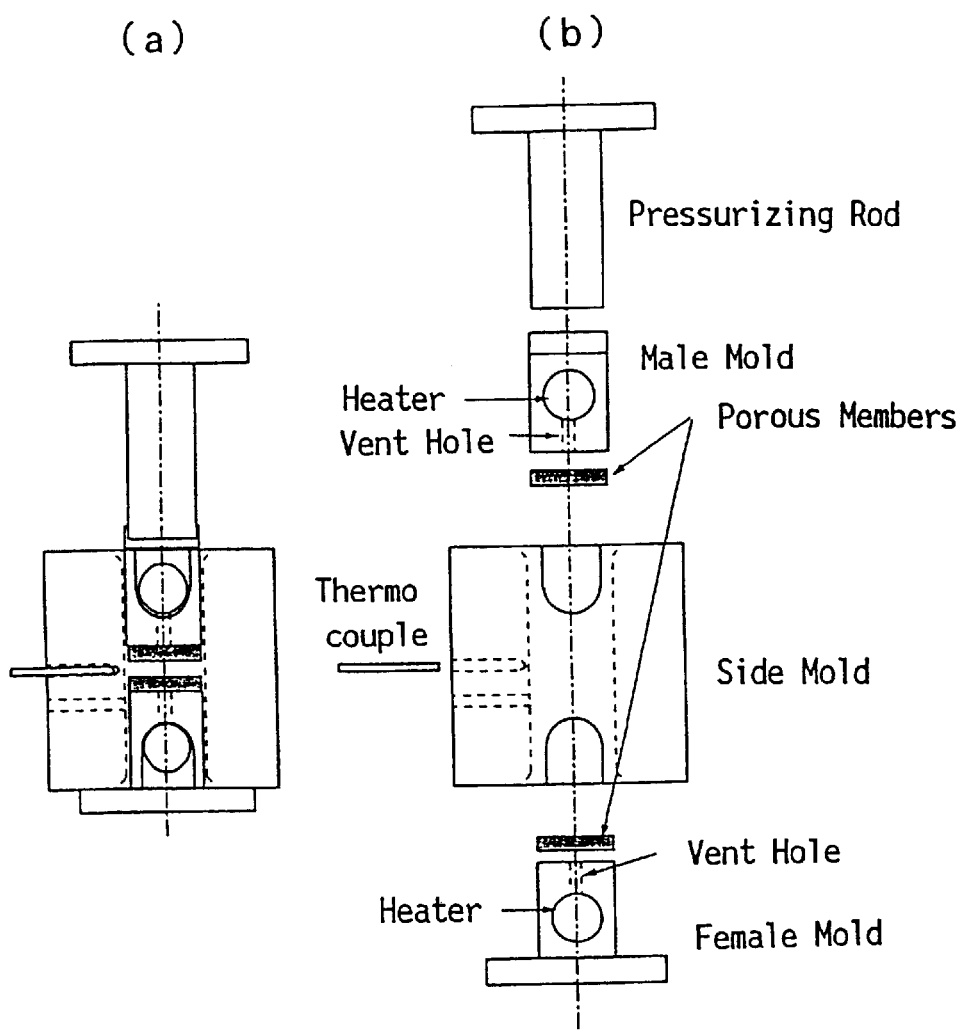
FIG. 10 is a structural view showing a mold in which mold gassing is possible, said mold being used in the production of molecular composite materials in Examples 1 to 7.

A gas is generated in the ring-closing reaction. In the present invention, it is preferred that the heating is performed with purging this gas because the ring-closing reaction is conducted in a mold. Accordingly, a mold provided with a vent hole and porous members at molding faces as shown in FIG. 10 is preferably used rather than a mold provided with no vent hole as shown in FIG. 9.

According to the above-mentioned method, the copolymer precursors homogeneously dispersed in the matrix polymers at the molecular level are converted to the aromatic heterocyclic copolymers as such, resulting in fine and homogeneous dispersion of the aromatic heterocyclic copolymers in the matrix polymers. Thus, the preformed molecular composite materials having good mechanical characteristics are obtained.

Further, in the ring-closing reaction, the restraint by the pressure of the molds prevents granular coagulation of molecules of the reinforcing materials form being granularly coagulated to form the three-dimensional mesh structure in the reinforcing materials or the aromatic heterocyclic copolymers, which can be dispersed in the matrix polymers finely and homogeneously to form the composite materials. Thus, general melt molding becomes possible, and the preformed molecular composite materials excellent in mechanical characteristics can be obtained without occurrence of large phase separation in molding and coagulation of the aromatic heterocyclic copolymers.

Figure 2:
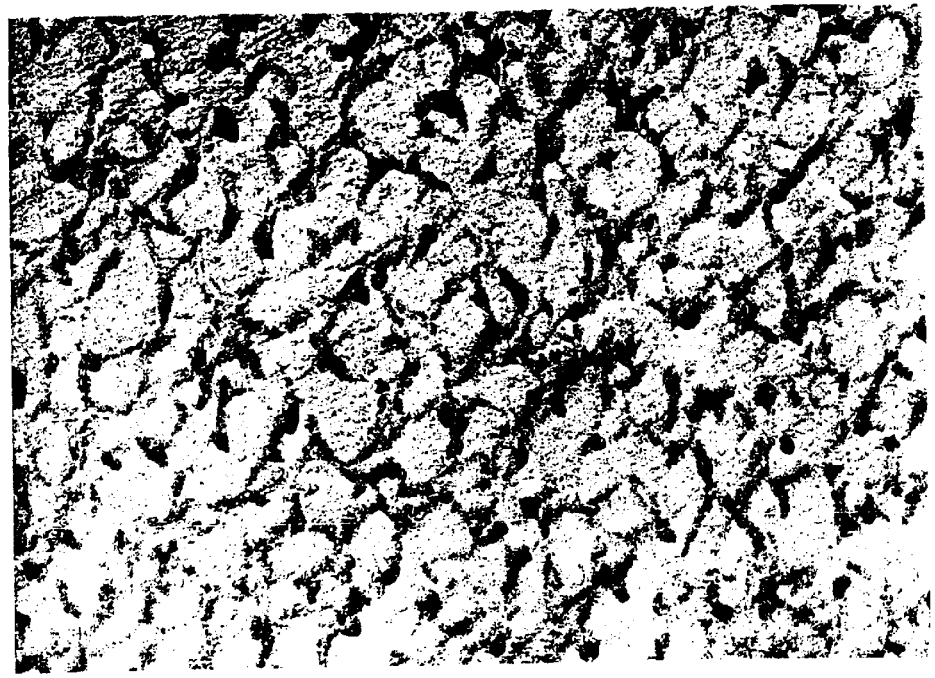
FIG. 2 is a transmission electron micrograph (magnification: 56,000×) showing the phase structure of a PBZ-T copolymer composite material of the present invention before carbonization.

FIG. 2 shows an example of a transmission electron micrograph showing the phase structure of a PBZ-T copolymer composite material before burning, and FIG. 1 shows an example of a transmission electron micrograph showing the phase structure of a fine particle dispersion type molecular composite material for comparison. As apparent from FIG. 2, the PBZ-T copolymer composite material has a structure in which a phase rich in the aromatic heterocyclic copolymer or the reinforcing polymer uniformly exists as a continuous three-dimensional mesh phase in a matrix polymer-rich phase. The average size of the meshes is preferably 1 μm or less, and the average size of the continuous phase of the aromatic heterocyclic copolymer is preferably 200 nm or less.

in the matrix polymers as described above, so that the composite materials can be applied to the general melt molding, do not produce coagulation of the reinforcing material polymers in molding, and do not generate large phase separation. When the composite materials are carbonized, therefore, the resulting carbon materials have excellent mechanical characteristics.

Methods for Producing Carbon Materials

The above-mentioned preformed three-dimensional mesh type molecular composite materials composed of the matrix polymers and the rigid aromatic polymers are taken out of the molds, and burned at atmospheric pressure. The composite materials are first heated up to 1,000° C. at a rate of temperature elevation of 100° C./hour to 200° C./hour in an atmosphere of an inert gas such as nitrogen or argon to carbonize them. A rate of temperature elevation of less than 100° C./hour results in too much time for carbonization, whereas exceeding 200° C./hour results in the fear of carbonization insufficiently terminating. In such a case, the composite materials are required to be maintained at about 1,000° C. for 1 hour to 2 hours.

Then, the carbonized composite materials are heated to high temperatures at a rate of temperature elevation of 400° C./hour to 600° C./hour to graphitize them as described above. The graphitization is preferably carried out at a temperature of 2,300° C. to 3,000° C. for 0.5 hour to 12 hours, and more preferably at a temperature of 2,500° C. to 2,800° C. for 2 hours to 6 hours. If the graphitization temperature is less than 2,300° C., the carbon materials having a desired degree of graphitization are not obtained. On the other hand, exceeding 3,000° C. results in a decrease in hardness of the carbon materials.

As described above, in the present invention, when the preformed composite materials are prepared using the aromatic heterocyclic copolymers generally poor in solubility, soluble only in strong acids, unmeltable by heat, poor in miscibility and difficult in forming, because of their high rigidity, together with the matrix polymers, the same fragments as those of the matrix polymers or fragments similar thereto are introduced into the aromatic heterocyclic copolymer precursors in which a hydrogen atom of at least one of functional groups having heterocycle forming ability is substituted by another functional group, thereby forming the copolymers. Thus, the miscibility with the matrix polymers is improved.

Further, in the ring-closing reaction, the restraint by the pressure of the molds prevents granular coagulation of molecules of the reinforcing materials form being granularly coagulated to form the three-dimensional mesh structure in the reinforcing materials or the aromatic heterocyclic copolymers, which can be dispersed in the matrix polymers finely and homogeneously to form the composite materials. Thus, general melt molding becomes possible, and the preformed molecular composite materials excellent in mechanical characteristics can be obtained without occurrence of large phase separation in molding and coagulation of the aromatic heterocyclic copolymers.

Then, the above-mentioned preformed molecular composite materials are carbonized and graphitized. Thus, the carbon materials as isotropic bulk materials can be obtained with the configurations before carbonization maintained, which causes the carbon materials of the present invention to have excellent mechanical characteristics.

The carbon materials thus obtained can be used for various applications such as electrodes, brushes, carbon rods, refractories, machine parts, materials for nuclear reactors, heating elements, structural materials, gaskets for high-temperature, high-pressure applications, heat insulating materials, corrosion-resistant materials, sealing materials and filters.

According to the present invention, in each of the aromatic heterocyclic copolymer precursors, a hydrogen atom of at least one of functional groups having heterocycle forming ability is substituted by another functional group, thereby solubilizing the precursors in organic solvents, making it possible to be well mixed in organic solvents, and moreover, raising the solubility.

Further, in the present invention, the same fragments as those of the matrix polymers or fragments similar thereto are introduced into the aromatic heterocyclic copolymer precursors or the reinforcing materials, thereby forming the copolymers. Accordingly, the miscibility of the aromatic heterocyclic copolymers with the matrix polymers is improved.

This makes it possible to lead the aromatic heterocyclic copolymers to mild spinodal decomposition, so that the aromatic heterocyclic copolymers and the matrix polymers form the three-dimensional mesh type molecular composite materials by specific heat treatment.

The aromatic heterocyclic copolymers or the reinforcing materials can be dispersed in the matrix polymers finely and homogeneously to form the composite materials by giving the three-dimensional mesh structure to the aromatic heterocyclic copolymers. Thus, general melt molding becomes possible, and the molecular composite materials excellent in mechanical characteristics can be obtained without occurrence of large phase separation in molding and coagulation of the aromatic heterocyclic copolymers.

The thus-obtained three-dimensional mesh type molecular composite materials composed of the matrix polymers and the rigid aromatic polymers can be heated while maintaining the configurations before carbonization (preforms), and the isotropic carbon materials can be produced. Further, according to the present invention, physical characteristics, particularly the conductivity, can be controlled by the compounding ratio of the rigid aromatic polymers to the matrix polymers, and the carbon materials of the present invention can be used as bulk materials for various applications such as electrodes, brushes, carbon rods, refractories, machine parts, materials for nuclear reactors, heating elements, structural materials, gaskets for high-temperature, high-pressure applications, heat insulating materials, corrosion-resistant materials, sealing materials and filters.

The present invention will be described with reference to examples in more detail below.

I. Synthesis of PBZ-T Random Copolymer Precursor (1) Synthesis of Random Copolymer In 15 ml of N-methylpyrrolidone (hereinafter referred to as "NMP"), 8 mmoles of compound (a) represented by the following formula:

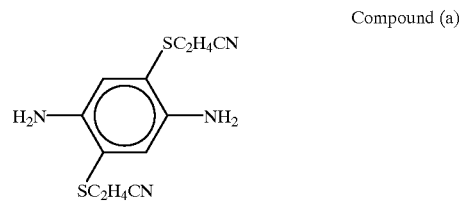

Compound (a)

and 2 mmoles of compound (b) represented by the following formula:

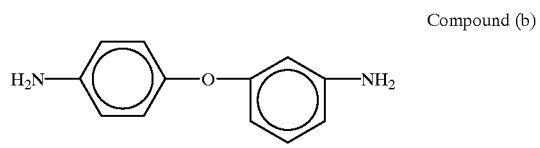

Compound (b)

were dissolved in an argon atmosphere to prepare a homogeneous solution.

This solution was cooled with ice together with the vessel, and 10 mmol of 2-chloroterephthaloyl dichloride was added thereto as a dicarboxylic acid derivative (c). The temperature of the solution was gradually elevated to room temperature with stirring. Then, the reaction was further continued for 6 hours while maintaining the temperature at room temperature. The resulting emerald green solution was poured in a large amount of methanol. This procedure was conducted with stirring methanol.

Stirring was continued for 30 minutes, followed by filtration. Then, reflux with a water-methanol solution was conducted overnight to remove the solvent. The resulting polymer was dried under vacuum at 100° C. for 24 hours. The yield was 99.8%. The inherent viscosity $\eta_{inh}$ of this polymer was 1.4 (dl/g). The intrinsic viscosity was measured at a polymer concentration in NMP of 0.5 g/dl at 30° C. by the Ubbelohde method. The structure of the resulting random copolymer precursor is considered to be as the following formula:

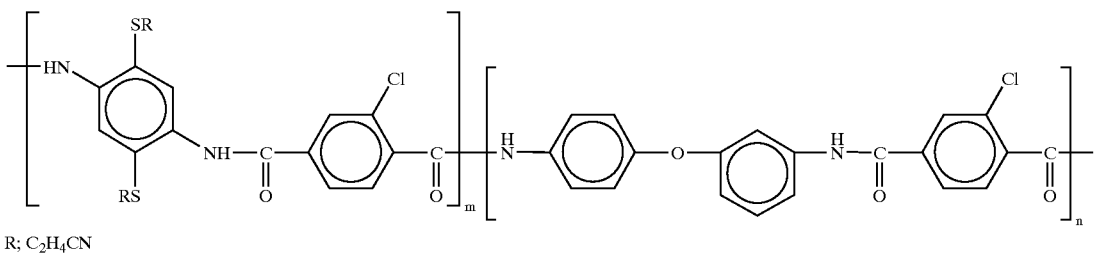

R; $C_2H_4CN$ wherein m:n is 8:2.
(2) Production of Molecular Composite Material
(a) Production of Three-Dimensional Mesh Type Molecular Composite Material Used in Examples 1 and 2

In 160 ml of NMP, 8.02 g of the random copolymer precursor obtained as described above and 31.97 g of an aromatic polyamide represented by the following formula as a matrix polymer were dissolved, and stirred at a temperature of room temperature to 80° C. for 1 week to obtain a homogeneous brown solution.

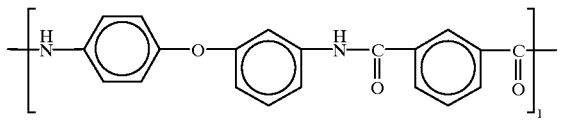

This solution was sprayed in a large amount of ethanol to obtain a coagulated composite powder composed of the random copolymer precursor and the matrix polymer. This was filtered, and the resulting coagulated powder was dried under vacuum at 100° C.

Figure 5:
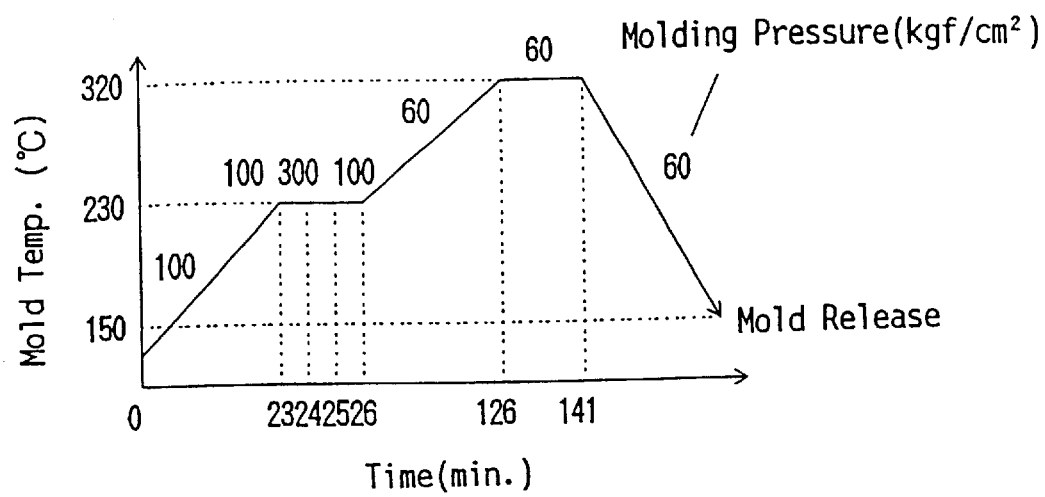
FIG. 5 is a graph showing a heating program of a mold used in the production of composite materials in Examples 1 to 4.

A mold shown in FIG. 10 was filled with the coagulated powder, and the mold hot pressing process was carried out under a pressure of 60 kgf/cm$^2$ to 300 kgf/cm$^2$ at 230° C., followed by elevation of the mold temperature as such to cyclize functional groups having heterocycle forming ability contained in the random copolymer precursor by heat treatment in the mold at 320° C., thereby forming an aromatic heterocyclic copolymer. Thus, a tabular formed article (T/P) of 50 mm×15 mm×2t mm was obtained. A heating program in this case is shown in FIG. 5.

The molding was performed in a glove box in an argon atmosphere. Further, the heating was conducted in the mold while releasing a gas developed by the ring-closing reaction.

For the bending properties of the resulting formed article, the elasticity was 713 kgf/mm$^2$, and the strength was 2.2 kgf/mm$^2$.
(b) Production of Three-Dimensional Mesh Type Molecular Composite Material Used in Examples 3 and 4

In 160 ml of NMP, 12.79 g of the above-mentioned random copolymer precursor and 27.21 g of the aromatic polyamide used in (a) as a matrix polymer were dissolved, and stirred at a temperature of room temperature to 80° C. for 1 week to obtain a homogeneous brown solution.

This solution was sprayed in a large amount of ethanol to obtain a coagulated composite powder composed of the random copolymer precursor and the matrix polymer. This was filtered, and the resulting coagulated powder was dried under vacuum at 100° C.

In the same manner as with (a), a mold shown in FIG. 10 was filled with the coagulated powder, and the mold hot pressing process was carried out under a pressure of 60 kgf/cm$^2$ to 300 kgf/cm$^2$ at 230° C., followed by elevation of the mold temperature as such to cyclize functional groups having heterocycle forming ability contained in the random copolymer precursor by heat treatment in the mold at 320° C., thereby forming an aromatic heterocyclic copolymer. Thus, a tabular formed article (T/P) of 50 mm×15 mm×2t mm was obtained.

For the bending properties of the resulting formed article, the elasticity was 1,215 kgf/mm$^2$, and the strength was 6.0 kgf/mm$^2$.

A transmission electron micrograph (magnification: 56,000×) of the formed article is shown in FIG. 2.

This micrograph shows that the formed article comprises two phases, a portion having the three-dimensional mesh structure and another portion. Further, the average size of the meshes was 0.5 μm or less, and the size of the continuous phase of the PBZ-T copolymer was about 60 nm.
(c) Production of Three-Dimensional Mesh Type Molecular Composite Material Used in Comparative Example 1

Figure 6:
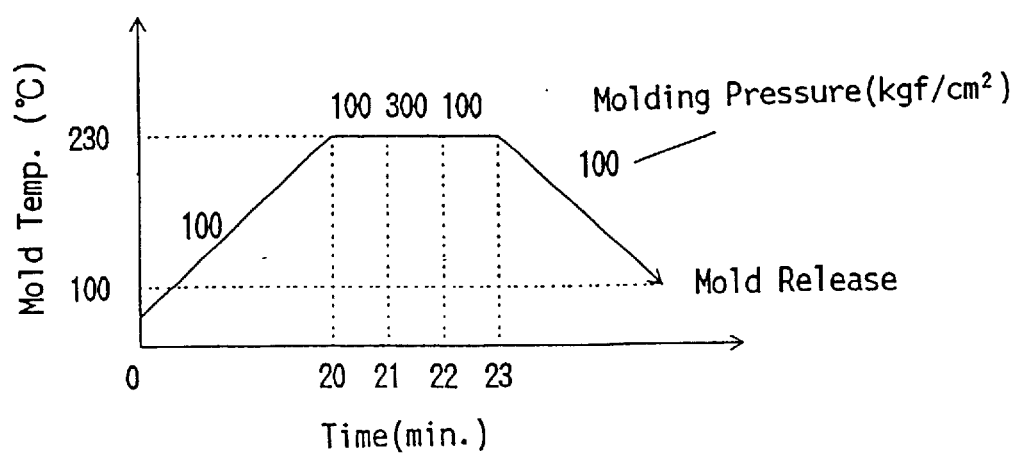
FIG. 6 is a graph showing a heating program of a mold used in the production of a composite material in Comparative Example 1.

A mold shown in FIG. 9 was filled with a powder composed of only the matrix polymer used in (a) and (b) described above and dried under vacuum at 100° C., and the powder was similarly heat treated under a pressure of 100 kgf/cm$^2$ to 300 kgf/cm$^2$ at 230° C. by the mold hot pressing process to obtain a tabular formed article (T/P) of 50 mm×15 mm×2t mm. A heating program in this case is shown in FIG. 6.

For the bending properties of the resulting formed article, the elasticity was 479 kgf/mm$^2$, and the strength was 20.4 kgf/mm$^2$.
(d) Production of Three-Dimensional Mesh Type Molecular Composite Material Used in Comparative Examples 2 and 3

In 160 ml of NMP, 12.79 g of the above-mentioned random copolymer precursor and 27.21 g of the aromatic polyamide used in (a) as a matrix polymer were dissolved, and stirred at a temperature of room temperature to 80° C. for 1 week to obtain a homogeneous brown solution.

This solution was sprayed in a large amount of ethanol to obtain a coagulated composite powder composed of the random copolymer precursor and the matrix polymer. This was filtered, and the resulting coagulated powder was dried under vacuum at 100° C.

This coagulated powder was heat treated under vacuum at 330° C. for 30 minutes to cyclize the random copolymer precursor, thereby preparing a PBZ-T copolymer.

Figure 7:
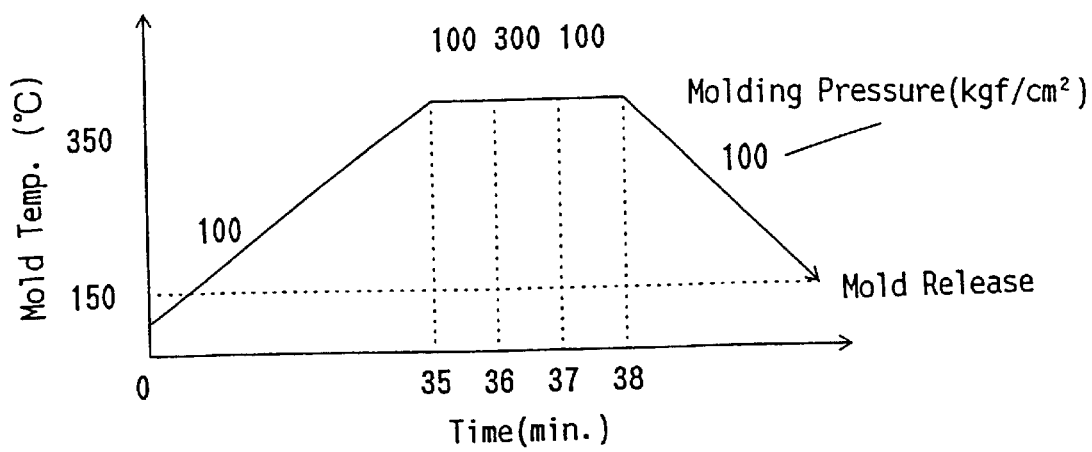
FIG. 7 is a graph showing a heating program of a mold used in the production of composite materials in Comparative Examples 2 and 3.

A mold shown in FIG. 9 was filled with the composite material thus obtained, and the mold hot pressing process was carried out under a pressure of 100 kgf/cm$^2$ to 300 kgf/cm$^2$ at 350° C. to obtain a tabular formed article (T/P) of 50 mm×15 mm×2t mm. A heating program in this case is shown in FIG. 7.

For the bending properties of the resulting formed article, the elasticity was 479 kgf/mm$^2$, and the strength was 20.4 kgf/mm$^2$.
II. Synthesis of PBZ-T Block Copolymer Precursor A block copolymer precursor represented by the same structural formula as that of the copolymer precursor synthesized in I was produced in the following manner.

(1) Synthesis of Oligomer (I) and Oligomer (II)

Five milliliters of NMP was placed in a well-dried 50-ml flask in a stream of dried argon, and 8 mmoles (2.227 g) of compound (a) described above was dissolved therein to prepare a homogeneous NMP solution.

To this solution cooled with ice together with the flask, 8.2 mmoles (1.947 g) of 2-chloroterephthaloyl chloride was further added as a dicarboxylic acid derivative (c), followed by stirring for 5 minutes to synthesize oligomer (I).

Similarly to the above-mentioned synthesis of oligomer (I), 10 ml of NMP was placed in a well-dried 50-ml flask in a stream of dried argon, and 2 mmoles (0.4004 g) of compound (b) described above was dissolved therein to prepare a homogeneous NMP solution.

To this solution cooled with ice together with the flask, 1.8 mmoles (0.427 g) of 2-chloroterephthaloyl chloride was further added as a dicarboxylic acid derivative (c), followed by stirring for 5 minutes to synthesize oligomer (II).

(2) Synthesis of PBZ-T Block Copolymer Precursor

The solution of oligomer (I) in NMP obtained by the above-mentioned procedure was added to the solution of oligomer (II) in NMP. Thereafter, the flask used for the solution of oligomer (I) in NMP was further washed with 2 ml of NMP, and the washings were also added to the solution of oligomer (II) in NMP.

The mixed oligomer solution was stirred for 1 hour under ice cooling, and the temperature thereof was elevated to room temperature with stirring. Then, stirring was further continued while maintaining the temperature of the solution at room temperature.

The resulting solution was poured in a large amount of methanol. This procedure was conducted with stirring methanol.

Then, this methanol solution was filtered, and the resulting precipitated (polymer) was dried under vacuum at 100° C. for 24 hours. The yield was 99.8%.

The inherent viscosity $\eta_{inh}$ of this polymer was 1.4. The intrinsic viscosity was measured at a polymer concentration in NMP of 0.5 g/dl at 30° C. by the Ubbelohde method.

In this polymer, the ratio of the degree of polymerization m of a moiety derived from oligomer (I) and exhibiting the rigidity to the degree of polymerization n of a moiety derived from oligomer (II) and exhibiting the flexibility in the entire molecule (m:n) was 8:2.

(3) Production of Molecular Composite Material
(e) Production of Molecular Composite Material Used in Examples 5 and 6

A solution of 12.81 g of the block copolymer precursor obtained by the above-mentioned method and 27.18 g of the matrix polymer in NMP was prepared, and poured in a large amount of ethanol to obtain a fibrous coagulum. This fibrous coagulum was dried under vacuum at 80° C. The resulting fibrous material was drawn at a draw ratio of 1.5 at 250° C., and pulverized to a size of 2 mm to 10 mm.

Figure 8:
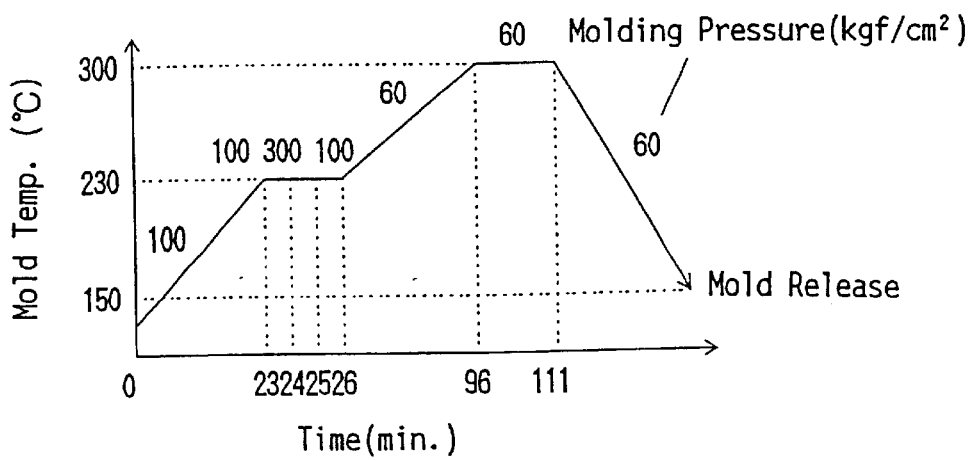
FIG. 8 is a graph showing a heating program of a mold used in the production of composite materials in Examples 5 to 7.

A mold shown in FIG. 10 was filled with the resulting material, and the mold hot pressing process was carried out under a pressure of 100 kgf/cm² to 300 kgf/cm² at 230° C., followed by elevation of the mold temperature as such to cyclize functional groups having heterocycle forming ability contained in the block copolymer precursor by heat treatment in the mold at 300° C., thereby forming an aromatic heterocyclic copolymer. Thus, a tabular formed article (T/P) of 50 mm×15 mm×2t mm was obtained. A heating program in this case is shown in FIG. 8.

The molding was performed in a glove box in an argon atmosphere. Further, the heating was conducted in the mold while releasing a gas developed by the ring-closing reaction.

For the bending properties of the resulting formed article, the elasticity was 731 kgf/mm², and the strength was 0.7 kgf/mm².

III. Synthesis of PBZ-T Homopolymer Precursor
(1) Synthesis of PBZ-T Homopolymer Precursor A PBZ-T homopolymer precursor, which is the same as oligomer (I) synthesized in II-(1), as shown by the following formula, was synthesized according to (1) the synthesis of oligomer (I) described above.

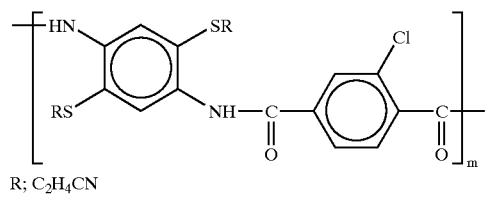

R; C₂H₄CN (2) Production of Molecular Composite Material
(f) Production of Molecular Composite Material Used in Example 7

In 160 ml of NMP, 12.76 g of the homopolymer precursor obtained as described above and 27.23 g of an aromatic polyamide represented by the following formula as a matrix polymer were dissolved, and stirred at a temperature of room temperature to 80° C. for 1 week to obtain a homogeneous brown solution.

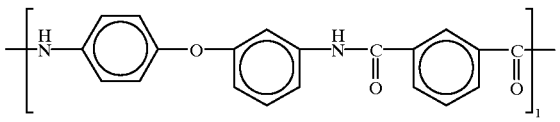

This solution was sprayed in a large amount of ethanol to obtain a coagulated composite powder composed of the homopolymer precursor and the matrix polymer. This was filtered, and the resulting coagulated powder was dried under vacuum at 100° C.

A mold shown in FIG. 10 was filled with this coagulated powder, and the mold hot pressing process was carried out under a pressure of 100 kgf/cm² to 300 kgf/cm² at 230° C., followed by elevation of the mold temperature as such to cyclize functional groups having heterocycle forming ability contained in the homopolymer precursor by heat treatment in the mold at 300° C., thereby forming an aromatic heterocyclic homopolymer. Thus, a tabular formed article (T/P) of 50 mm×15 mm×2t mm was obtained. A heating program in this case is shown in FIG. 8.

For the bending properties of the resulting formed article, the elasticity was 710 kgf/mm², and the strength was 3.2 kgf/mm².

When a mold shown in FIG. 9 was filled with the coagulated powder of the PBZ-T homopolymer precursor and the resulting formed article (T/P) was cyclized at 350° C. according to the heating program shown in FIG. 7, a decrease in weight of 32.1% by weight was observed. It is therefore deduced that the PBZ-T homopolymer precursor is cyclized by the reaction represented by the following reaction equation (9) to form the PBZ-T homopolymer.

Reaction Equation (9)

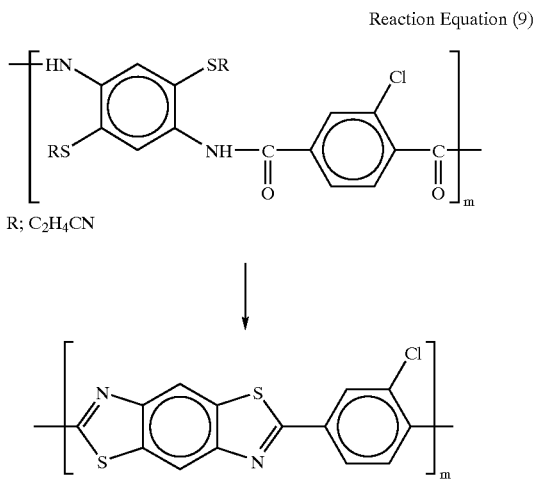

R; C₂H₄CN

EXAMPLE 1

The above-mentioned preformed three-dimensional mesh type random copolymer molecular composite material composed of the matrix polymer and the rigid aromatic polymer (the PBZ-T copolymer was added in an amount of 20% by weight) was taken out of the mold, and carbonized at atmospheric pressure.

That is to say, the tabular formed article (T/P) (bending elasticity: 713 kgf/mm$^2$, bending strength: 2.2 kgf/mm$^2$) formed by the mold hot pressing was heat treated at a rate of temperature elevation of 100° C./hour in a nitrogen atmosphere, and then, maintained at 700° C. for 2 hours. The carbonized product was allowed to cool to room temperature, and the properties thereof were measured.

The surface electrical resistance was measured by the four-terminal method using an MPC-tester manufactured by Mitsubishi Petrochemical Co., Ltd. Results of measurement are shown in Table 1.

EXAMPLE 2

The temperature of the tabular formed article (T/P) obtained in the same manner as with Example 1 was elevated to 1,000° C. at a rate of temperature elevation of 100° C./hour, and thereafter, to 2,600° C. at a rate of temperature elevation of 500° C./hour. Then, the resulting product was maintained at this temperature for 2 hours. The carbonized product was allowed to cool to room temperature, and the properties thereof were measured. Results of measurement are shown in Table 1.

EXAMPLE 3

The above-mentioned preformed three-dimensional mesh type random copolymer molecular composite material composed of the matrix polymer and the rigid aromatic polymer (the PBZ-T copolymer was added in an amount of 30% by weight) was taken out of the mold, and burned at atmospheric pressure, in the same manner as with Example 1.

That is to say, the tabular formed article (T/P) (bending elasticity: 916 kgf/mm$^2$, bending strength: 3.6 kgf/mm$^2$) formed by the mold hot pressing was heat treated at a rate of temperature elevation of 100° C./hour in a nitrogen atmosphere, and then, maintained at 700° C. for 2 hours. The burned product was allowed to cool to room temperature, and the properties thereof were measured. Results of measurement are shown in Table 1.

EXAMPLE 4

The temperature of the tabular formed article (T/P) obtained in the same manner as with Example 3 was elevated to 1,000° C. at a rate of temperature elevation of 100° C./hour, and thereafter, to 2,600° C. at a rate of temperature elevation of 500° C./hour. Then, the resulting product was maintained at this temperature for 2 hours. The carbonized product was allowed to cool to room temperature, and the properties thereof were measured. Results of measurement are shown in Table 1.

EXAMPLE 5

The above-mentioned preformed three-dimensional mesh type block copolymer molecular composite material composed of the matrix polymer and the rigid aromatic polymer (the PBZ-T copolymer was added in an amount of 30% by weight) was taken out of the mold, and burned at atmospheric pressure, in the same manner as with Example 1.

That is to say, the tabular formed article (T/P) (bending elasticity: 731 kgf/mm$^2$, bending strength: 0.7 kgf/mm$^2$) formed by the mold hot pressing was heat treated at a rate of temperature elevation of 100° C./hour in a nitrogen atmosphere, and then, maintained at 700° C. for 2 hours. The carbonized product was allowed to cool to room temperature, and the properties thereof were measured. Results of measurement are shown in Table 1.

EXAMPLE 6

The temperature of the tabular formed article (T/P) obtained in the same manner as with Example 5 was elevated to 1,000° C. at a rate of temperature elevation of 100° C./hour, and thereafter, to 2,600° C. at a rate of temperature elevation of 500° C./hour. Then, the resulting product was maintained at this temperature for 2 hours. The carbonized product was allowed to cool to room temperature, and the properties thereof were measured. Results of measurement are shown in Table 1.

EXAMPLE 7

The above-mentioned preformed three-dimensional mesh type molecular composite material composed of the matrix polymer and the rigid aromatic polymer (the PBZ-T homopolymer was added in an amount of 30% by weight) was taken out of the mold, and burned at atmospheric pressure, in the same manner as with Example 1.

That is to say, the temperature of the tabular formed article (T/P) obtained was elevated to 1,000° C. at a rate of temperature elevation of 100° C./hour, and thereafter, to 2,600° C. at a rate of temperature elevation of 500° C./hour. Then, the resulting product was maintained at this temperature for 2 hours. The carbonized product was allowed to cool to room temperature, and the properties thereof were measured. Results of measurement are shown in Table 1.

Comparative Example 1

The above-mentioned tabular formed article (T/P) composed of only the matrix polymer was similarly taken out of the mold, and carbonized at atmospheric pressure.

That is to say, the tabular formed article (T/P) (bending elasticity: 479 kgf/mm$^2$, bending strength: 20.4 kgf/mm$^2$) formed by the mold hot pressing was heat treated at a rate of temperature elevation of 100° C./hour in a nitrogen atmosphere, and then, maintained at 700° C. for 2 hours. The carbonized product was allowed to cool to room temperature. As a result, the formed article was melted to lose its shape.

Comparative Example 2

The above-mentioned preformed fine particle dispersion type molecular composite material composed of the matrix polymer and the rigid aromatic polymer (the PBZ-T homopolymer was added in an amount of 30% by weight) was taken out of the mold, and carbonized at atmospheric pressure, in the same manner as with Example 1.

That is to say, the tabular formed article (T/P) formed by the mold hot pressing was heat treated at a rate of temperature elevation of 100° C./hour in a nitrogen atmosphere, and then, maintained at 700° C. for 2 hours. The carbonized product was allowed to cool to room temperature. Results of measurement are shown in Table 1.

Comparative Example 3

The temperature of the tabular formed article (T/P) obtained in the same manner as with Comparative Example 3 was elevated to 1000° C. at a rate of temperature elevation of 100° C./hour, and thereafter, to 2,600° C. at a rate of temperature elevation of 500° C./hour. Then, the resulting product was maintained at this temperature for 2 hours. The carbonized product was allowed to cool to room temperature. As a result, the formed article collapsed to a powdery substance.

These results are summarized in Table 1. In Table 1, the three-dimensional mesh type molecular composite material is abbreviated as "three-dimensional mesh type MC", and the fine particle dispersion type molecular composite material as "fine particle dispersion type MC".

As a result of high-temperature carbonization treatment of various preformed composite materials, the preformed composite material composed of only the matrix polymer was melted to lose its shape when heated at 700° C., as shown in Comparative Example 1. Although the preformed fine particle dispersion type molecular composite material keeps its shape when carbonized at 700° C., as shown in Comparative Example 2, it collapsed to a powdery substance when carbonized at 2,600° C., as shown in Comparative Example 3. On the other hand, as apparent from Examples 1 to 6, the preformed three-dimensional mesh type composite materials produced carbon materials keeping their tabular shape even when carbonized at 2,600° C., different from the fine particle dispersion type molecular composite material.

Figure 3:
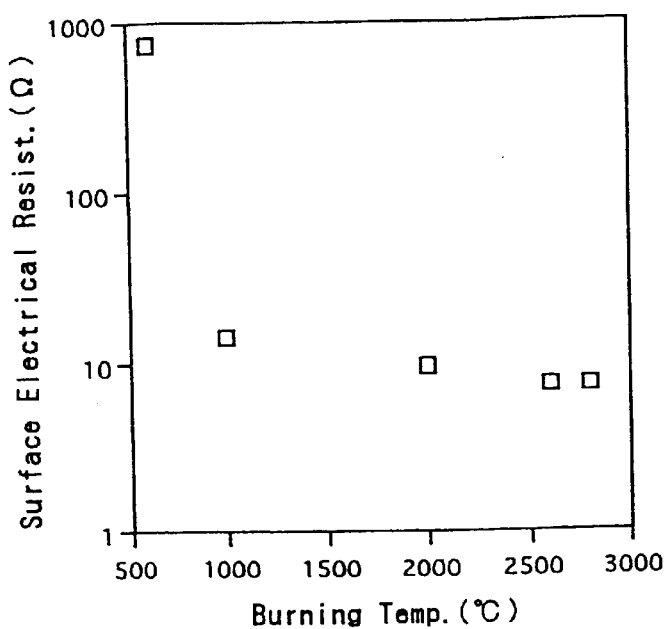
FIG. 3 is a graph showing the relationship between the carbonization temperature of a PBZ-T copolymer composite material of the present invention and the surface electrical resistance of carbonized products.

Then, the relationship between the carbonization temperature of a PBZ-T copolymer composite material of the present invention and the surface electrical resistance of carbonized products is shown in FIG. 3. As apparent from FIG. 3, the surface electrical resistance is improved with an increase in carbonization temperature.

Figure 4:
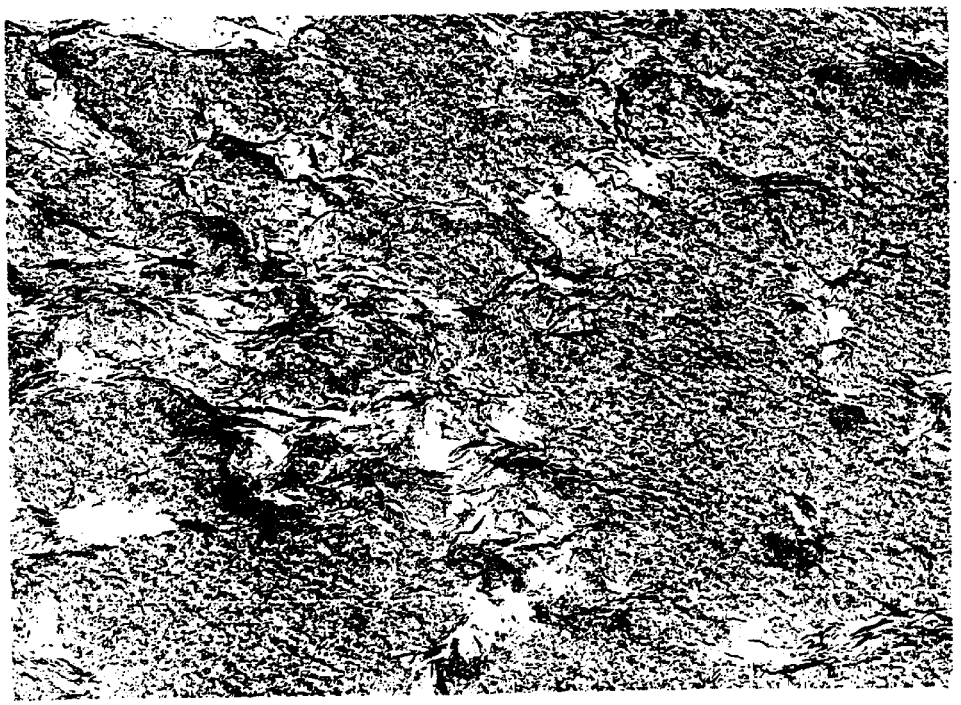
FIG. 4 is a transmission electron micrograph (magnification: 44,000×) showing the surface structure of a product obtained by carbonizing a molecular composite material of the present invention composed of a PBZ-T random copolymer and 3,4'-diaminodiphenyl-2-chloroterephthalamide at 2,600° C.

Further, an ultrathin section method transmission electron micrograph of the product obtained by carbonizing the molecular composite material composed of the PBZ-T random copolymer and 3,4'-diaminodiphenyl-2-chloroterephthalamide (Example 3) at 2,600° C. is shown in FIG. 4.

It is known that the aromatic polyamide or the matrix polymer is a material difficult to be graphitized, whereas PBZ-T or the rigid polymer is a material graphitizable in the drawn state. In FIG. 4, linear layer structure carbon deduced

TABLE 1

| | Composite Form | PBZ-T Form | Amount Added (wt %) | Carbonization Temperature (° C.) | Bending Properties (kgf/mm$^2$) Elasticity | Bending Properties (kgf/mm$^2$) Strength | Surface Electrical Resistance (Ω) | Note |
|---|---|---|---|---|---|---|---|---|
| Example | | | | | | | | |
| 1 | Three-dimensional mesh type MC | Random Copolymer | 20 | 700 | — | — | 0.590 | — |
| 2 | Three-dimensional mesh type MC | Random Copolymer | 20 | 2600 | 1040 | 11.4 | 0.005 | — |
| 3 | Three-dimensional mesh type MC | Random Copolymer | 30 | 700 | 1315 | 1.4 | 0.570 | — |
| 4 | Three-dimensional mesh type MC | Random Copolymer | 30 | 2600 | 3229 | 6.0 | 0.004 | — |
| 5 | Three-dimensional mesh type MC | Block Copolymer | 30 | 700 | 1052 | 1.6 | 0.610 | — |
| 6 | Three-dimensional mesh type MC | Block Copolymer | 30 | 2600 | 752 | 3.1 | 0.007 | — |
| 7 | Three-dimensional mesh type MC | Homopolymer | 30 | 2600 | 765 | 2.9 | 0.007 | — |
| | | | 30 | — | 710 | 3.2 | — | — |
| Comparative Example | | | | | | | | |
| 1 | Only matrix | | — | 700 | — | — | — | Melted |
| 2 | Fine particle dispersion type MC | Random Copolymer | 30 | 700 | 677 | 0.6 | 8.000 | — |
| 3 | Fine particle dispersion type MC | Random Copolymer | 30 | 2600 | — | — | — | Collapsed | to be formed by graphitization of PBZ-T fibrils is obviously confirmed in turbulent layer structure carbon produced from 3,4'-diaminodiphenyl-2-chloroterephthalamide. That is to say, this shows that a carbon/carbon composite nanometer is formed.

As described above, it has been confirmed that the preformed three-dimensional mesh type composite materials have the effect of keeping their T/P shape in carbonization and graphitization. Further, a comparison of carbonization treatment data at 700° C. proves that the carbon materials obtained from the three-dimensional mesh type composite materials have the effect of improving the conductivity, compared with the fine particle dispersion type materials. Furthermore, the conductivity is improved with an increase in the amount of PBZ-T added, and can be controlled thereby.

What is claimed:

1. A method for producing a carbon material, comprising the steps of:

providing a compound having a first functional group wherein at least one hydrogen atom of said first functional group is substituted by another functional group;

providing an aromatic heterocyclic copolymer precursor containing at least one functional group having heterocyclic ring forming ability by using said compound;

mixing a matrix polymer with said aromatic heterocyclic copolymer precursor in an organic solvent to form a mixed solution;

removing the solvent therefrom to form a coagulum;

molding said coagulum with hot pressing to obtain a formed article at a temperature at which the heterocyclic ring-closing reaction does not occur;

heat treating said formed article in a mold under pressure, thereby preparing a 3-dimensional mesh molecular composite material in which the heterocyclic ring-closing reaction of said functional group having heterocyclic ring forming ability occurs, thereby forming said aromatic heterocyclic copolymer; and carbonizing the resulting composite material at atmospheric pressure in an inert gas atmosphere at 2,300° C. to 3,000° C. for 2 to 6 hours.

2. The method according to claim 1, wherein the step of forming said coagulum by mold hot pressing is performed in an inert gas atmosphere at a temperature at which ring-closing reaction does not occur, wherein the weight ratio of the aromatic heterocyclic copolymer to the matrix polymer in said three-dimensional mesh molecular composite material is within the range of 1:99 to 70:30.

3. The method according to claim 1, in which said matrix polymer is a polyamide.

4. The method according to claim 3, in which the polyamide is an aromatic polyamide.

5. The method according to claim 1, in which said aromatic heterocyclic copolymer is at least one selected from the group consisting of a polybenzothiazole copolymer and a polybenzoxazole copolymer.

6. The method according to claim 1, in which said matrix polymer is an aromatic polyamide and said aromatic heterocyclic copolymer is a polybenzothiazole copolymer or a polybenzoxazole copolymer.

7. The method according to claim 1, in which a hydrogen atom of at least one of the functional groups contained in the aromatic heterocyclic copolymer precursor, is substituted by a trimethylsilyl group or a cyanoethyl group.

8. The method according to claim 1, in which said organic solvent is one solvent selected from the group consisting of N-methyl-2-pyrrolidone, hexamethylphosphoric triamide and N,N-dimethylacetamide and dimethyl sulfoxide.

9. The method according to claim 1, in which said composite material is powdery, film-like, fibrous or tabular in shape.

* * * * *